United States Patent
Minnen et al.

(10) Patent No.: US 9,317,128 B2
(45) Date of Patent: Apr. 19, 2016

(54) REMOTE DEVICES USED IN A MARKERLESS INSTALLATION OF A SPATIAL OPERATING ENVIRONMENT INCORPORATING GESTURAL CONTROL

(71) Applicants: David Minnen, Los Angeles, CA (US); Paul Yarin, Los Angeles, CA (US)

(72) Inventors: David Minnen, Los Angeles, CA (US); Paul Yarin, Los Angeles, CA (US)

(73) Assignee: Oblong Industries, Inc., Los Angeles, CA (US)

(*) Notice: Subject to any disclaimer, the term of this patent is extended or adjusted under 35 U.S.C. 154(b) by 0 days.

(21) Appl. No.: 14/216,500

(22) Filed: Mar. 17, 2014

(65) Prior Publication Data
US 2015/0054729 A1 Feb. 26, 2015

Related U.S. Application Data

(63) Continuation-in-part of application No. 12/572,689, filed on Oct. 2, 2009, now Pat. No. 8,866,740, and a continuation-in-part of application No. 12/572,698, filed on Oct. 2, 2009, now Pat. No. 8,860,168, and a (Continued)

(51) Int. Cl.
*G09G 5/00* (2006.01)
*G06F 3/01* (2006.01)
(Continued)

(52) U.S. Cl.
CPC ............. *G06F 3/017* (2013.01); *G06F 3/1423* (2013.01); *G06K 9/00355* (2013.01); *G06K 9/00375* (2013.01)

(58) Field of Classification Search
CPC ...... G06F 3/017; G06F 3/0325; G06F 3/1423; G06K 9/00375; G06K 9/00355; G06K 2009/3225
USPC .................................................. 345/156–178
See application file for complete search history.

(56) References Cited

U.S. PATENT DOCUMENTS

| | | | |
|---|---|---|---|
| 4,843,568 A | 6/1989 | Krueger et al. |
| 5,454,043 A | 9/1995 | Freeman |
| 5,581,276 A | 12/1996 | Cipolla et al. |

(Continued)

FOREIGN PATENT DOCUMENTS

| | | |
|---|---|---|
| WO | 8909972 A1 | 10/1989 |
| WO | 9935633 A3 | 9/1999 |

(Continued)

OTHER PUBLICATIONS

Addison-Wesley: "Inside Macintosh—Volume I", vol. I Chapter 1-8, Jan. 1, 1985, pp. 1-58.

(Continued)

*Primary Examiner* — Vijay Shankar
(74) *Attorney, Agent, or Firm* — IPR Law Group, PC

(57) ABSTRACT

Embodiments described herein includes a system comprising a processor coupled to display devices, sensors, remote client devices, and computer applications. The computer applications orchestrate content of the remote client devices simultaneously across the display devices and the remote client devices, and allow simultaneous control of the display devices. The simultaneous control includes automatically detecting a gesture of at least one object from gesture data received via the sensors. The detecting comprises identifying the gesture using only the gesture data. The computer applications translate the gesture to a gesture signal, and control the display devices in response to the gesture signal.

2 Claims, 24 Drawing Sheets

Related U.S. Application Data continuation-in-part of application No. 13/850,837, filed on Mar. 26, 2013, and a continuation-in-part of application No. 12/417,252, filed on Apr. 2, 2009, and a continuation-in-part of application No. 12/487,623, filed on Jun. 18, 2009, and a continuation-in-part of application No. 12/553,845, filed on Sep. 3, 2009, now Pat. No. 8,531,396, and a continuation-in-part of application No. 12/553,902, filed on Sep. 3, 2009, now Pat. No. 8,537,111, and a continuation-in-part of application No. 12/553,929, filed on Sep. 3, 2009, now Pat. No. 8,537,112, and a continuation-in-part of application No. 12/557,464, filed on Sep. 10, 2009, and a continuation-in-part of application No. 12/579,340, filed on Oct. 14, 2009, and a continuation-in-part of application No. 13/759,472, filed on Feb. 5, 2013, and a continuation-in-part of application No. 12/579,372, filed on Oct. 14, 2009, and a continuation-in-part of application No. 12/773,605, filed on May 4, 2010, now Pat. No. 8,681,098, and a continuation-in-part of application No. 12/773,667, filed on May 4, 2010, now Pat. No. 8,723,795, and a continuation-in-part of application No. 12/789,129, filed on May 27, 2010, and a continuation-in-part of application No. 12/789,262, filed on May 27, 2010, now Pat. No. 8,669,939, and a continuation-in-part of application No. 12/789,302, filed on May 27, 2010, now Pat. No. 8,665,213, and a continuation-in-part of application No. 13/430,509, filed on Mar. 26, 2012, now Pat. No. 8,941,588, and a continuation-in-part of application No. 13/430,626, filed on Mar. 26, 2012, now Pat. No. 8,896,531, and a continuation-in-part of application No. 13/532,527, filed on Jun. 25, 2012, now Pat. No. 8,941,589, and a continuation-in-part of application No. 13/532,605, filed on Jun. 25, 2012, and a continuation-in-part of application No. 13/532,628, filed on Jun. 25, 2012, now Pat. No. 8,941,590, and a continuation-in-part of application No. 13/888,174, filed on May 6, 2013, now Pat. No. 8,890,813, and a continuation-in-part of application No. 13/909,980, filed on Jun. 4, 2013, and a continuation-in-part of application No. 14/048,747, filed on Oct. 8, 2013, and a continuation-in-part of application No. 14/064,736, filed on Oct. 28, 2013, now abandoned, and a continuation-in-part of application No. 14/078,259, filed on Nov. 12, 2013, and a continuation-in-part of application No. 14/145,016, filed on Dec. 31, 2013, and a continuation-in-part of application No. 14/206,800, filed on Mar. 12, 2014.

(60) Provisional application No. 61/787,792, filed on Mar. 15, 2013, provisional application No. 61/787,650, filed on Mar. 15, 2013.

(51) Int. Cl.
    *G06F 3/14*     (2006.01)
    *G06K 9/00*     (2006.01)

(56) References Cited

U.S. PATENT DOCUMENTS

| | | | |
|---|---|---|---|
| 5,594,469 A * | 1/1997 | Freeman et al. | 345/158 |
| 5,651,107 A | 7/1997 | Frank et al. | |
| 5,982,352 A | 11/1999 | Pryor | |
| 6,002,808 A | 12/1999 | Freeman | |
| 6,043,805 A | 3/2000 | Hsieh | |
| 6,049,798 A | 4/2000 | Bishop et al. | |
| 6,072,494 A | 6/2000 | Nguyen | |
| 6,075,895 A | 6/2000 | Qiao et al. | |
| 6,191,773 B1 * | 2/2001 | Maruno et al. | 345/158 |
| 6,198,485 B1 | 3/2001 | Mack et al. | |
| 6,215,890 B1 | 4/2001 | Matsuo et al. | |
| 6,222,465 B1 * | 4/2001 | Kumar et al. | 341/20 |
| 6,256,033 B1 | 7/2001 | Nguyen | |
| 6,351,744 B1 | 2/2002 | Landresse | |
| 6,385,331 B2 | 5/2002 | Harakawa et al. | |
| 6,456,728 B1 | 9/2002 | Doi et al. | |
| 6,501,515 B1 | 12/2002 | Iwamura | |
| 6,515,669 B1 | 2/2003 | Mohri | |
| 6,703,999 B1 | 3/2004 | Iwanami et al. | |
| 6,819,782 B1 | 11/2004 | Imagawa et al. | |
| 7,034,807 B2 | 4/2006 | Maggioni | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,109,970 B1 * | 9/2006 | Miller | 345/156 |
| 7,129,927 B2 | 10/2006 | Mattsson | |
| 7,145,551 B1 | 12/2006 | Bathiche et al. | |
| 7,170,492 B2 | 1/2007 | Bell | |
| 7,227,526 B2 | 6/2007 | Hildreth et al. | |
| 7,229,017 B2 | 6/2007 | Richley et al. | |
| 7,259,747 B2 | 8/2007 | Bell | |
| 7,340,077 B2 | 3/2008 | Gokturk et al. | |
| 7,348,963 B2 | 3/2008 | Bell | |
| 7,366,368 B2 | 4/2008 | Morrow et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,421,093 B2 | 9/2008 | Hildreth et al. | |
| 7,428,542 B1 | 9/2008 | Fink et al. | |
| 7,430,312 B2 | 9/2008 | Gu | |
| 7,466,308 B2 | 12/2008 | Dehlin | |
| 7,559,053 B2 | 7/2009 | Krassovsky et al. | |
| 7,598,942 B2 * | 10/2009 | Underkoffler et al. | 345/158 |
| 7,665,041 B2 * | 2/2010 | Wilson et al. | 715/863 |
| 7,834,846 B1 | 11/2010 | Bell | |
| 7,850,526 B2 | 12/2010 | Zalewski et al. | |
| 7,979,850 B2 | 7/2011 | Ivanov et al. | |
| 8,059,089 B2 | 11/2011 | Daniel | |
| 8,212,550 B2 | 7/2012 | Katsurahira et al. | |
| 8,363,098 B2 | 1/2013 | Rosener et al. | |
| 8,370,383 B2 | 2/2013 | Kramer et al. | |
| 8,407,725 B2 | 3/2013 | Kramer et al. | |
| 8,531,396 B2 | 9/2013 | Underkoffler et al. | |
| 8,537,111 B2 | 9/2013 | Underkoffler et al. | |
| 8,537,112 B2 | 9/2013 | Underkoffler et al. | |
| 8,625,849 B2 | 1/2014 | Hildreth et al. | |
| 8,669,939 B2 | 3/2014 | Underkoffler et al. | |
| 8,681,098 B2 | 3/2014 | Underkoffler et al. | |
| 8,723,795 B2 | 5/2014 | Underkoffler et al. | |
| 8,745,541 B2 * | 6/2014 | Wilson et al. | 715/863 |
| 2002/0041327 A1 | 4/2002 | Hildreth et al. | |
| 2002/0065950 A1 | 5/2002 | Katz et al. | |
| 2002/0126876 A1 | 9/2002 | Paul et al. | |
| 2002/0184401 A1 | 12/2002 | Kadel et al. | |
| 2002/0186200 A1 | 12/2002 | Green | |
| 2002/0186221 A1 | 12/2002 | Bell | |
| 2002/0194393 A1 | 12/2002 | Hrischuk et al. | |
| 2003/0048280 A1 | 3/2003 | Russell | |
| 2003/0076293 A1 | 4/2003 | Mattsson | |
| 2003/0103091 A1 | 6/2003 | Wong et al. | |
| 2003/0169944 A1 | 9/2003 | Dowski et al. | |
| 2004/0125076 A1 | 7/2004 | Green | |
| 2004/0145808 A1 | 7/2004 | Cathey et al. | |
| 2004/0161132 A1 | 8/2004 | Cohen et al. | |
| 2004/0183775 A1 | 9/2004 | Bell | |
| 2004/0193413 A1 * | 9/2004 | Wilson et al. | 704/243 |
| 2005/0006154 A1 | 1/2005 | Back et al. | |
| 2005/0031166 A1 | 2/2005 | Fujimura et al. | |
| 2005/0212753 A1 | 9/2005 | Marvit et al. | |
| 2005/0257013 A1 | 11/2005 | Ma | |
| 2006/0010400 A1 | 1/2006 | Dehlin et al. | |
| 2006/0055684 A1 | 3/2006 | Rimas-Ribikauskas et al. | |
| 2006/0098873 A1 | 5/2006 | Hildreth et al. | |
| 2006/0138225 A1 | 6/2006 | Richley et al. | |
| 2006/0173929 A1 | 8/2006 | Wilson | |

(56) References Cited

U.S. PATENT DOCUMENTS

| | | |
|---|---|---|
| 2006/0177103 A1 | 8/2006 | Hildreth |
| 2006/0187196 A1 | 8/2006 | Underkoffler et al. |
| 2006/0208169 A1 | 9/2006 | Breed et al. |
| 2006/0269145 A1 | 11/2006 | Roberts |
| 2006/0281453 A1 | 12/2006 | Jaiswal et al. |
| 2007/0021208 A1 | 1/2007 | Mao et al. |
| 2007/0112714 A1 | 5/2007 | Fairweather |
| 2007/0121125 A1 | 5/2007 | Dodge et al. |
| 2007/0139541 A1 | 6/2007 | Fein et al. |
| 2007/0266310 A1 | 11/2007 | Sasaki et al. |
| 2007/0282951 A1 | 12/2007 | Selimis et al. |
| 2007/0288467 A1 | 12/2007 | Strassner et al. |
| 2008/0018595 A1 | 1/2008 | Hildreth et al. |
| 2008/0030460 A1 | 2/2008 | Hildreth et al. |
| 2008/0056536 A1 | 3/2008 | Hildreth et al. |
| 2008/0059578 A1 | 3/2008 | Albertson et al. |
| 2008/0062123 A1 | 3/2008 | Bell |
| 2008/0112592 A1 | 5/2008 | Wu et al. |
| 2008/0114873 A1 | 5/2008 | Chakravarty et al. |
| 2008/0137913 A1 | 6/2008 | Hildreth |
| 2008/0166022 A1 | 7/2008 | Hildreth |
| 2008/0187178 A1 | 8/2008 | Shamaie |
| 2008/0199071 A1 | 8/2008 | Gu |
| 2008/0205701 A1 | 8/2008 | Shamaie et al. |
| 2008/0208517 A1 | 8/2008 | Shamaie |
| 2008/0219502 A1 | 9/2008 | Shamaie |
| 2008/0235965 A1 | 10/2008 | Jaiswal et al. |
| 2008/0267447 A1 | 10/2008 | Kelusky et al. |
| 2008/0273755 A1 | 11/2008 | Hildreth |
| 2009/0003686 A1 | 1/2009 | Gu |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0051648 A1 | 2/2009 | Shamaie et al. |
| 2009/0052785 A1 | 2/2009 | Shamaie |
| 2009/0079813 A1 | 3/2009 | Hildreth |
| 2010/0013905 A1 | 1/2010 | Kumar et al. |
| 2010/0060568 A1 | 3/2010 | Fisher et al. |
| 2010/0063813 A1 | 3/2010 | Richter et al. |
| 2010/0066821 A1 | 3/2010 | Rosener et al. |
| 2010/0090946 A1 | 4/2010 | Underkoffler et al. |
| 2010/0128062 A1 | 5/2010 | Kramer et al. |
| 2010/0131549 A1 | 5/2010 | Kramer et al. |
| 2010/0188328 A1 | 7/2010 | Dodge et al. |
| 2010/0207607 A1 | 8/2010 | Katsurahira et al. |
| 2010/0306713 A1 | 12/2010 | Geisner et al. |
| 2010/0315439 A1 | 12/2010 | Huang et al. |
| 2011/0025598 A1 | 2/2011 | Underkoffler et al. |
| 2011/0173632 A1 | 7/2011 | Arimilli et al. |
| 2012/0054671 A1 | 3/2012 | Thompson et al. |
| 2012/0200494 A1 | 8/2012 | Perski et al. |
| 2012/0206337 A1 | 8/2012 | Hildreth et al. |
| 2012/0229383 A1 | 9/2012 | Hamilton et al. |
| 2012/0239396 A1 | 9/2012 | Johnston et al. |
| 2014/0325373 A1 | 10/2014 | Kramer et al. |
| 2015/0077326 A1 | 3/2015 | Kramer et al. |

FOREIGN PATENT DOCUMENTS

| | | |
|---|---|---|
| WO | 2008134452 A2 | 11/2008 |
| WO | 2010030822 A1 | 3/2010 |

OTHER PUBLICATIONS

Bacon J., et al., "Using Events to Build Distributed Applications", Second International Workshop on Services in Distributed and Networked Environments, 1995, pp. 148-155.

European Search Report for Application No. EP09014670, mailed on Jan. 4, 2013, 20 pages.

Form PCT/ISA/210, PCT/US06/04497, "PCT International Search Report," 1 page.

Form PCT/ISA/210, PCT/US08/61457, "PCT International Search Report," 2 pages.

Form PCT/ISA/210, PCT/US09/39285, "PCT International Search Report," 2 pages.

Form PCT/ISA/220, PCT/US06/04497, "PCT Notification of Transmittal of the International Search Report and the Written Opinion of the International Searching Authority, or the Declaration," 1 page.

Form PCT/ISA/220, PCT/US08/61457, "PCT Notification of Transmittal of the International Search Report and the Written Opinion of the International Searching Authority, or the Declaration," 1 page.

Form PCT/ISA/220, PCT/US09/39285, "PCT Notification of Transmittal of the International Search Report and the Written Opinion of the International Searching Authority, or the Declaration," 1 page.

Form PCT/ISA/237, PCT/US06/04497, "PCT Written Opinion of the International Searching Authority," 3 pages.

Form PCT/ISA/237, PCT/US08/61457, "PCT Written Opinion of the International Searching Authority," 6 pages.

Form PCT/ISA/237, PCT/US09/39285, "PCT Written Opinion of the International Searching Authority," 6 pages.

Form/IB/373, PCT/US06/04497, "International Report on Patentability," 1 page.

International Search Report and Written Opinion for Application No. PCT/US2013/067129, mailed on Mar. 27, 2014, 5 pages.

International Search Report and Written Opinion for Application No. PCT/US2013/069725, mailed on Mar. 27, 2014, 5 pages.

Jiang H., et al., "Demis: A Dynamic Event Model for Interactive Systems", Proceedings of the ACM Symposium on Virtual Reality Software and Technology, 2002, pp. 97-104.

Johanson B., et al., "The Event Heap: A Coordination Infrastructure for Interactive Workspaces", Proceedings Fourth IEEE Workshop on Mobile Computing Systems and Applications, 2002, pp. 83-93.

Johanson B., et al., "The Interactive Workspaces Project: Experiences with Ubiquitous Computing Rooms", IEEE Pervasive Computing, 2002, vol. 1 (2), pp. 67-74.

Mansouri-Samani M., et al., "A Configurable Event Service for Distributed Systems", Third International Conference on Annapolis Configurable Distributed Systems, 1996, pp. 210-217.

Michael J Carey., et al., "The Architecture of the Exodus Extensible Dbms", Proceeding OODS, 1986, pp. 52-65.

Partial European Search Report for Application No. EP09014670, mailed on Aug. 3, 2012, 7 pages.

Partial European Search Report for Application No. EP10781229, mailed on Dec. 3, 2014, 6 pages.

Rubine D., "Specifying Gestures by Example", Computer Graphics, 1991, vol. 25 (4), pp. 329-337.

Supplementary European Search Report for Application No. EP06720525, mailed on Jul. 22, 2010, 6 pages.

Supplementary European Search Report for Application No. EP09728557, mailed on Sep. 29, 2014, 11 pages.

Supplementary European Search Report for Application No. EP09767774, mailed on Feb. 27, 2013, 11 pages.

Supplementary European Search Report for Application No. EP09812234, mailed on Sep. 6, 2011, 6 pages.

Supplementary European Search Report for Application No. EP09821219, mailed on Oct. 2, 2014, 8 pages.

Supplementary European Search Report for Application No. EP10772727, mailed on Nov. 26, 2012, 5 pages.

Supplementary European Search Report for Application No. EP10781229, mailed on Mar. 23, 2015, 11 pages.

Supplementary European Search Report for Application No. EP12802574, mailed on May 19, 2015, 6 pages.

Velipasalar S., et al., "Specifying, Interpreting and Detecting High-level, Spatio-Temporal Composite Events in Single and Multi-Camera Systems", Conference on Computer Vision and Pattern Recognition Workshop, 2006, pp. 110-110.

William A McCuskey., "On Automatic Design of Data Organization", American Federation of Information Processing Societies, 1970, pp. 187-199.

\* cited by examiner

Sample images showing the eight hand shapes evaluated

American Sign Language fingerspelling alphabet

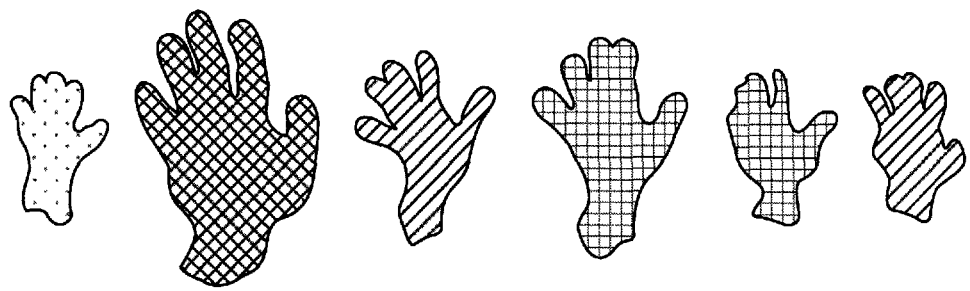
(a) *open-hand*
(b) *opf-open-left*
Sample images showing some of the variation across users for the same hand shape category. The top row shows examples of *open-hand* while the bottom row shows *ofp-open-left*.
FIG. 4

Example frames showing pseudo-color depth images along with tracking results (squares), track history (squiggle lines), and recognition results (text labels) along with a confidence value.

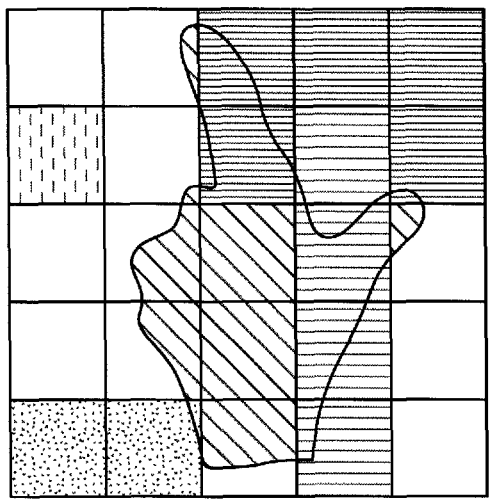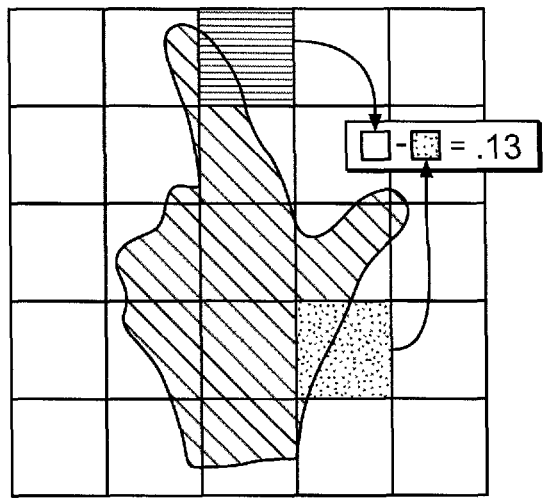
(a) Feature Set B      (a) Feature Set C
Illustration of features extracted for (a) Set B showing four rectangles and (b) Set C showing the difference in mean depth between one pair of grid cells.
FIG. 7

Comparison of hand shape recognition accuracy for randomized decision forest (RF) and support vector machine (SVM) classifiers over four feature sets. Feature set A uses global statistics, B uses normalized occupancy rates in different rectangles, C uses depth differences between points, and D combines sets A, B, and C (see Section 4.1 for details).

Comparison of hand shape recognition accuracy using different numbers of trees in the randomized decision forest. The graph shows mean accuracy and ±2σ lines depicting an approximate 95% confidence interval (blue circles, left axis) along with the mean time to classify a single example (diamonds, right axis).

Depict pose with left hand as viewed from back

```
p = pinkie
r = ring finger
m = middle finger
i = index finger
t = thumb

^       = curled non-thumb
>       = curled thumb
|       = straight finger or thumb pointed straight up
\ or /  = straight finger or thumb pointing at angle
x       = finger or thumb pointing into plane
```

| Pose name | p | r | m | i | t |
|---|---|---|---|---|---|
| | | | Hand Pose | | |
| fist | ^ | ^ | ^ | ^ | > |
| ofp-closed | ^ | ^ | ^ | \| | > |
| ofp-open-left | ^ | ^ | ^ | \| | - |
| ofp-open-right | ^ | ^ | ^ | \| | - |
| open hand | \ | / | \ | / | - |
| palm open left | \| | \| | \| | \| | - |
| palm open right | \| | \| | \| | \| | - |
| victory | ^ | ^ | \ | / | > |

*FIG. 11*

Add hand orientation to complete pose must specify two variables
1. palm direction (if hand were flat)
2. finger direction (if hand were flat)

| | |
|---|---|
| - | medial |
| + | lateral |
| x | anterior |
| * | posterior |
| ^ | cranial |
| v | caudal | orientation variables come after colon, e.g.:

^ ^ x | - : - x          x-y-z start position

^ ^ \ / > : * v          upside-down v

*FIG. 12*

| ID | Label | Description | Hand 1 | | Hand 2 | |
|---|---|---|---|---|---|---|
| 1 | grabnav / pan & zoom | drive cursor in zoom and lock cursor to map for lateral or depth scrolling | VV-x^ or \|\|\|-x^ to ^^^> | open hand or open palm pushing into screen transitions to fist, which can move in xy - or z plane | | |
| 2 | palette | prompts lens menu | ^^\|-x^ | ofp-open ceiling transitions to thumb click | | |
| 3 | victory | full rest out of lens selection | ^^V>-x^ | V-sign | | |
| 4 | frame-it | creates an instance of lens that can be resized | ^^\|-x^ | ofp-open hands with the index fingers parallel point upward toward the ceiling. | ^^\|-x^ | ofp-open hands with the index fingers parallel point upward toward the ceiling |
| 5 | cinematographer | change aspect ratio of lens, i.e. resize | ^^\|-x^ | ofp-open hands with the index finger pointing upward toward the ceiling. | ^^\|-x^ | ofp-open hands with the index fingers perpendicular to hand-1 index finger |

Gestures for spatial mapping application in kiosk

*FIG. 13*

| ID | Label | Description | Hand 1 | | Hand 2 | |
|---|---|---|---|---|---|---|
| 4 | frame-it | creates an instance of lens that can then be resized | ^^^\|-:X^ | ofp-open hands with the index fingers parallel point upward toward the ceiling. | ^^^\|-:X^ | ofp-open hands with the index fingers parallel point upward toward the ceiling |
| 5 | cinematographer | change aspect ratio of lens, i.e. resize | ^^^\|-:x^ | ofp-open hands with the index finger pointing upward toward the ceiling. | ^^^\|-:x^ | ofp-open hands with the index fingers perpendicular to hand-1 index finger |
| 6 | click L/R | click left/right to previous/next | ^^^\|-:x^ | Ofp-open followed by clicking thumb up | | |
| 7 | home/end | jump to first or last slide, reflecting direction of point | ^^^\|-:x^ or ^^^\|>:x^ | ofp-open or ofp-closed points to fist | ^^^^>:x^ | fist |
| 8 | pushback | push slides into receding perspective, enabling rapid scrolling across slides | \|\|\|\|-:x^ | Push palm toward screen | | |
| 9 | jog dial | velocity-based scrolling through slides | ^^^\|-:x^ | ofp-open | ^^^\|>:x^ | ofp-closed |

Gestures for media browser application in kiosk

*FIG. 14*

| ID | Label | Description | Hand 1 | | Hand 2 | |
|---|---|---|---|---|---|---|
| 3 | victory | select application from suite menu | ^^\|>:x^ | V-sign | | |
| 8 | pushback | navigate application choices in suite menu | \|\|\|\|-:x^ | Push palm toward screen | | |

Gestures for a suite including upload/pointer/rotate applications in kiosk

*FIG. 15*

Jitter and Filtering

The need for filtering

One goal of designing any gestural interface is to provide users with the as much precision and expressiveness as possible while making the various actions in the system easy and enjoyable to perform.

With interactions such as the map navigation gesture where the user's physical movements directly drive the logical movements of the digital map, unintended motion or noise can make getting to a desired location difficult or impossible. Sources of noise include the natural trembling of the user's hand, error due to low-fidelity tracking sensors, and artifacts of the algorithms used in tracking the user's motion.

To counter these sources of noise, the raw spatial movements are fed through a simple, first-order, low-pass filter before being applied to any interface elements they are driving. In the gestural map application, this filtering is used in all analog-type gestures such as the grab navigation, frame-it, and vertical menu gestures to name a few.

Adaptive filtering

The simple low-pass filter is enough to make the most analog gestures usable. However, special care must still be taken in cases like the grab navigation gesture. As the figure shows, the exponential mapping of hand displacement to zoom exacerbates the noise the further the user moves his hand.

To counter this effect, the strength of the filter is increased in proportion to the user's displacement.

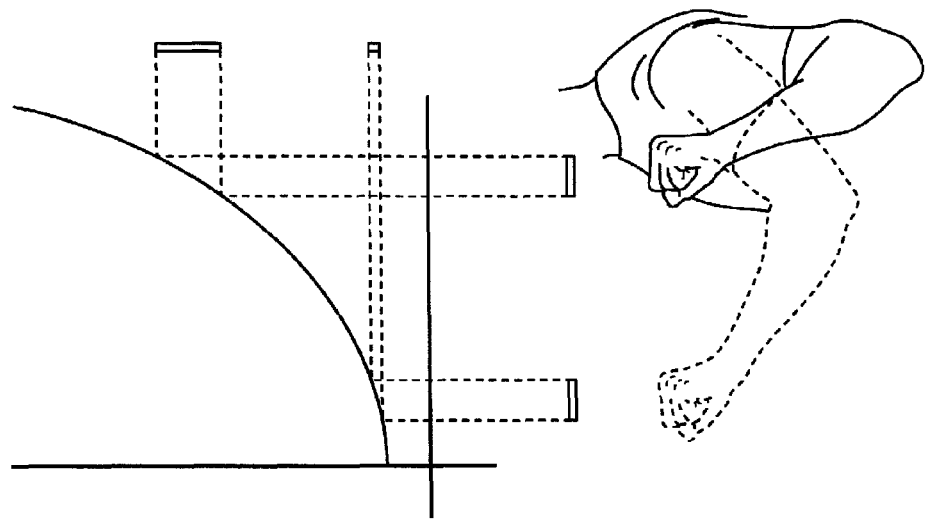

FIG. 16A $$f(x) = 1 + \frac{\exp(E \cdot x) - 1}{\exp(E) - 1} \cdot Z_{max}$$

Normalized displacement allows the full zoom range to be mapped to user's individual range of motion (i.e. child and adult have equal control over system despite physical differences in arm length.)

For negative hand displacements (pushing away), the Zoom Factor is calculated as:

$$Z = \frac{i1}{f(11 \cdot 11)}$$

REMOTE DEVICES USED IN A MARKERLESS INSTALLATION OF A SPATIAL OPERATING ENVIRONMENT INCORPORATING GESTURAL CONTROL

RELATED APPLICATIONS

This application claims the benefit of U.S. Patent Application No. 61/787,792, filed Mar. 15, 2013.

This application claims the benefit of U.S. Patent Application No. 61/787,650, filed Mar. 15, 2013.

This application is a continuation in part application of U.S. patent application Ser. Nos. 12/572,689, 12/572,698, 13/850,837, 12/417,252, 12/487,623, 12/553,845, 12/553,902, 12/553,929, 12/557,464, 12/579,340, 13/759,472, 12/579,372, 12/773,605, 12/773,667, 12/789,129, 12/789,262, 12/789,302, 13/430,509, 13/430,626, 13/532,527, 13/532,605, 13/532,628, 13/888,174, 13/909,980, 14/048,747, 14/064,736, 14/078,259, 14/145,016, and 14/206,800.

TECHNICAL FIELD

The embodiments described herein relate generally to processing system and, more specifically, to gestural control in spatial operating environments.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE FIGURES

FIG. 4 shows sample images showing variation across users for the same hand shape category.

FIG. 7 shows feature extraction, under an embodiment.

FIG. 11 is a diagram of poses in a gesture vocabulary of the SOE, under an embodiment.

FIG. 12 is a diagram of orientation in a gesture vocabulary of the SOE, under an embodiment.

FIG. 13 is an example of commands of the SOE in the kiosk system used by the application spatial mapping, under an embodiment.

FIG. 14 is an example of commands of the SOE in the kiosk system used by the application media browser, under an embodiment.

FIG. 15 is an example of commands of the SOE in the kiosk system used by applications including upload, pointer, rotate, under an embodiment.

FIGS. 16A-16D describe aspects of mapping hand displacement to system zoom, under an embodiment.

DETAILED DESCRIPTION

Figure 1A:
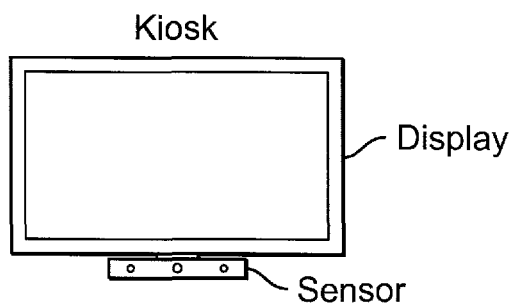
FIG. 1A is a block diagram of the SOE kiosk including a display and a sensor, under an embodiment.

The embodiments described herein include a Spatial Operating Environment (SOE) kiosk (also referred to as "kiosk" or "SOE kiosk"), in which a spatial operating environment (SOE) and its gestural interface operate within a reliable, markerless hand tracking system. This combination of an SOE with gloveless gesture recognition provides new functionalities, incorporating (1) novelties in tracking and classification of hand shapes and (2) developments in the design, execution, and purview of SOE applications.

U.S. patent application Ser. No. 12/572,689, which is a continuation of U.S. Pat. No. 7,598,942, describes a system and method for gesture-based control, which identifies users' hands in the form of glove or gloves with certain indicia. The innovation of an SOE kiosk system includes its markerless setting in which gestures are tracked and detected in a gloveless, indicia-free system, providing unusual finger detection and latency.

Fully stated, in both description and innovations, the kiosk acts as an expression of the spatial operating environment (SOE). An SOE institutes new functionalities in computer-human interactions, including, for example, its gestural interface. The design, architecture, and execution of an SOE make specific requirements of its input, as well as its participating applications.

The description herein includes the following sections describing aspects of the kiosk system integrating SOE, markerless input, and applications, but the embodiment is not so limited:
(1) context of an SOE;
(2) overview of a kiosk;
(3) description of figures in a disclosure;
(4) markerless tracking and detection algorithm for an SOE kiosk;
(5) gestures of an SOE kiosk;
(6) applications of an SOE kiosk;
(7) fields of use of an SOE kiosk.

:Context of an SOE

U.S. patent application Ser. No. 12/773,605 describes components of the SOE to include at least a gestural input/output, a network-based data representation, transit, and interchange, and a spatially conformed display mesh. In scope the SOE resembles an operating system as it is a complete application and development platform. It assumes, though, a perspective enacting design and function that extend beyond traditional computing systems. Enriched, capabilities include a gestural interface, where a user interacts with a system that tracks and interprets hand poses, gestures, and motions.

As described in detail in the numerous patents and patent applications referenced herein, all of which are incorporated herein by reference, an SOE enacts real-world geometries to enable such interface and interaction. Per the '605 application, for example, it employs a spatially conformed display mesh that aligns physical space and virtual space such that the visual, aural, and haptic displays of a system exist within a "real-world" expanse.

This entire area of its function is realized by the SOE in terms of a three-dimensional geometry. Pixels have a location in the world, in addition to resolution on a monitor, as the two-dimensional monitor itself has a size and orientation. In this scheme, real-world coordinates annotate properties. This descriptive capability covers all SOE participants. For example, devices such as wands and mobile units can be one of a number of realized input elements.

This authentic notion of space pervades the SOE. At every level, it provides access to its coordinate notation. As the location of an object (whether physical or virtual) can be expressed in terms of geometry, so then the spatial relationship between objects (whether physical or virtual) can be expressed in terms of geometry. (Again, any kind of input device can be included as a component of this relationship.) When a user points to an object on a screen, as the '605 application notes, the SOE interprets an intersection calculation. The screen object reacts, responding to a user's operations.

When the user perceives and responds to this causality, supplanted are old modes of computer interaction. The user acts understanding that within the SOE, the graphics are in the same room with her. The result is direct spatial manipulation. In this dynamic interface, inputs expand beyond the constraints of old methods. The SOE opens up the full volume of three-dimensional space and accepts diverse input elements.

Into this reconceived and richer computing space, the SOE brings recombinant networking, a new approach to interoperability. U.S. patent application Ser. No. 12/109,263 describes that the SOE is a new programming environment that sustains large-scale multi-process interoperation. The SOE described herein and in the various patents and patent applications described herein, is built with "plasma," an architecture that institutes, as stated in the '263 application, at least the following:

efficient exchange of data between large numbers of processes;
flexible data "typing" and structure, so that widely varying kinds and uses of data are supported;
flexible mechanisms for data exchange (local memory, disk, network, etc.), all driven by substantially similar APIs;
data exchange between processes written in different programming languages;
automatic maintenance of data caching and aggregate state.

Regardless of technology stack or operating system, the SOE makes use of external data and operations, including legacy expressions. This includes integrating spatial data of relatively low-level quality from devices including but not limited to mobile units such as the iPhone. Such devices are also referred to as "edge" units.

:Overview of a Kiosk

Figure 1B:
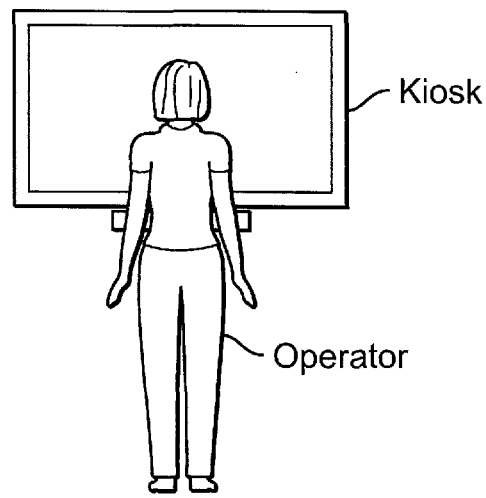
FIG. 1B shows a relationship between the SOE kiosk and an operator, under an embodiment.

As stated above, the '689 application describes a system and method for gesture-based control, which identify users' hands in the form of glove or gloves with certain indicia, and other patent applications described herein have noted additional input elements of an SOE. A "kiosk" system provides the robust approach of the SOE within a self-contained markerless setting. A user engages the SOE as a "free" agent, without gloves, markers, or any such indicia, nor does it require space modifications such as installation of screens, cameras, or emitters. The only requirement is proximity to the system that detects, tracks, and responds to hand shapes and other input elements. The system, comprising representative sensors combined with the markerless tracking system, as described in detail herein, provides pose recognition within a pre-specified range (e.g., between one and three meters, etc.). The kiosk system's benefits include flexibility in portability and installation but embodiments are not so limited. FIG. 1A is a block diagram of the SOE kiosk including a display and a sensor, under an embodiment. FIG. 1B shows a relationship between the SOE kiosk and an operator, under an embodiment.

The general term "kiosk" encompasses a variety of set-ups or configurations that use this markerless tracking method. These different installations include, for example, a sensor, display, and computer that runs the SOE integrating the vision pipeline. Hardware of embodiments is not limited to but includes the following as representative examples:

1. iMac-based kiosk: 27" version of the Apple iMac with an Asus Xtion Pro, slightly customized. The plastic stand from the Xtion removed, the sensor is affixed to the top of the iMac. A Tenba case, modified, contains the iMac, sensor, and accessories including keyboard, mouse, power cable, and power strip.

2. Portable mini-kiosk: 30" screen with small form-factor Dell PC. As screen and stand are separate from the processor, this set-up supports both landscape and portrait orientations in display.

3. Kiosk comprising at least the following:
   a. Display—50" 1920×1080 TV accepting DVI or HDMI input.
   b. Sensor—Asus Xtion Pro Live, Asus Xtion Pro, Microsoft Kinect, Microsoft Kinect for Windows, Panasonic D-Imager, SoftKinetic DS311, or Tyzx G3 EVS.
   c. Computer—small form-factor Dell PC running a quad-core CPU and an NVIDIA NVS 420 GPU.

The set-up also may include network capabilities, whether provided by connected devices such as a router or engaged through access such as wireless.

:Markerless Tracking

U.S. Patent Application No. 61/643,124 describes the tracking and detection system of the kiosk for which the algorithm and its implementation achieve novelties in at least the areas of precision of tracking, detecting, and classifying finger and hand shapes, and low processing and interactive latency for such process, but is not so limited. Low-cost depth cameras create new opportunities for robust and ubiquitous vision-based interfaces. While much research has focused on full-body pose estimation and the interpretation of gross body movement, this work investigates skeleton-free hand detection, tracking, and shape classification. Embodiments described herein provide a rich and reliable gestural interface by developing methods that recognize a broad set of hand shapes and which maintain high accuracy rates across a wide range of users. Embodiments provide real-time hand detection and tracking using depth data from the Microsoft Kinect. Quantitative shape recognition results are presented for eight hand shapes collected from 16 users and physical configuration and interface design issues are presented that help boost reliability and overall user experience.

Hand tracking, gesture recognition, and vision-based interfaces have a long history within the computer vision community. See for example, one or more of the following: R. A. Bolt. Put-that-there: Voice and gesture at the graphics interface, Conference on Computer Graphics and Interactive Techniques, 1980; A. Erol, G. Bebis, M. Nicolescu, R. Boyle, and X. Twombly, Vision-based hand pose estimation: A review, Computer Vision and Image Understanding, 108:52-73, 2007; S. Mitra and T. Acharya, Gesture recognition: A survey, IEEE Transactions on Systems, Man and Cybernetics-Part C, 37(3):311-324, 2007; T. B. Moeslund and E. Granum, A survey of computer vision-based human motion capture, Computer Vision and Image Understanding, 81:231-268, 2001; T. B. Moeslund, A. Hilton, and V. Kruger, A survey of advances in vision-based human motion capture and analysis, Computer Vision and Image Understanding, 104:90-126, 2006; X. Zabulis, H. Baltzakis, and A. Argyros, Vision-based hand gesture recognition for human-computer interaction, The Universal Access Handbook, pages 34.1-34.30, 2009.

The work of Plagemann et al. presents a method for detecting and classifying body parts such as the head, hands, and feet directly from depth images. They equate these body parts with geodesic extrema, which are detected by locating connected meshes in the depth image and then iteratively finding mesh points that maximize the geodesic distance to the previous set of points. The process is seeded by either using the centroid of the mesh or by locating the two farthest points. The approach presented herein is conceptually similar but it does not require a pre-specified bounding box to ignore clutter. Furthermore, Plagemann et al. used a learned classifier to identify extrema as a valid head, hand, or foot, whereas our method makes use of a higher-resolution depth sensor and recognizes extrema as one of several different hand shapes. See for example, C. Plagemann, V. Ganapathi, D. Koller, and S. Thrun, Real-time identification and localization of body parts from depth images, IEEE International Conference on Robotics and Automation (ICRA), 2010.

Shwarz et al. extend the work of Plagemann et al. by detecting additional body parts and fitting a full-body skeleton to the mesh. They also incorporate optical flow information to help compensate for self-occlusions. The relationship to the embodiments presented herein, however, is similar to that of Plagemann et al. in that Shwarz et al. make use of global information to calculate geodesic distance which will likely reduce reliability in cluttered scenes, and they do not try to detect finger configurations or recognize overall hand shape. See for example, L. A. Schwarz, A. Mkhitaryan, D. Mateus, and N. Navab, Estimating human 3 d pose from time-of-flight images based on geodesic distances and optical flow, Automatic Face and Gesture Recognition, pages 700-706, 2011.

Shotton et al. developed a method for directly classifying depth points as different body parts using a randomized decision forest trained on the distance between the query point and others in a local neighborhood. Their goal was to provide higher-level information to a real-time skeleton tracking system and so they recognize 31 different body parts, which goes well beyond just the head, hands, and feet. The approach described herein also uses randomized decision forests because of their low classification overhead and the model's intrinsic ability to handle multi-class problems. Embodiments described herein train the forest to recognize several different hand shapes, but do not detect non-hand body parts. See for example: L. Breiman, Random forests, Machine Learning, 45(1):5-32, 2001; J. Shotton, A. Fitzgibbon, M. Cook, T. Sharp, M. Finocchio, R. Moore, A. Kipman, and A. Blake, Real-time human pose recognition in parts from a single depth image, IEEE Conf on Computer Vision and Pattern Recognition, 2011.

In vision-based interfaces, hand tracking is often used to support user interactions such as cursor control, 3D navigation, recognition of dynamic gestures, and consistent focus and user identity. Although many sophisticated algorithms have been developed for robust tracking in cluttered, visually noisy scenes, long-duration tracking and hand detection for track initialization remain challenging tasks. Embodiments described herein build a reliable, markerless hand tracking system that supports the creation of gestural interfaces based on hand shape, pose, and motion. Such an interface requires low-latency hand tracking and accurate shape classification, which together allow for timely feedback and a seamless user experience. See for example: J. Deutscher, A. Blake, and I. Reid, Articulated body motion capture by annealed particle filtering. Computer Vision and Pattern Recognition, pages 126-133, 2000; A. Argyros and M. Lourakis, Vision-based interpretation of hand gestures for remote control of a computer mouse, Computer Vision in HCI, pages 40-51, 2006.1.

Embodiments described herein make use of depth information from a single camera for local segmentation and hand detection. Accurate, per-pixel depth data significantly reduces the problem of foreground/background segmentation in a way that is largely independent of visual complexity. Embodiments therefore build body-part detectors and tracking systems based on the 3D structure of the human body rather than on secondary properties such as local texture and color, which typically exhibit a much higher degree of variation across different users and environments. See for example: J. Shotton, A. Fitzgibbon, M. Cook, T. Sharp, M. Finocchio, R. Moore, A. Kipman, and A. Blake, Real-time human pose recognition in parts from a single depth image. IEEE Conf on Computer Vision and Pattern Recognition, 2011; C. Plagemann, V. Ganapathi, D. Koller, and S. Thrun, Real-time identification and localization of body parts from depth images, IEEE International Conference on Robotics and Automation (ICRA), 2010.

Embodiments provide markerless hand tracking and hand shape recognition as the foundation for a vision-based user interface. As such, it is not strictly necessary to identify and track the user's entire body, and, in fact, it is not assumed that the full body (or even the full upper body) is visible. Instead, embodiments envision situations that only allow for limited visibility such as a seated user where a desk occludes part of the user's arm so that the hand is not observably connected to the rest of the body. Such scenarios arise quite naturally in real-world environments where a user may rest their elbow on their chair's arm or where desktop clutter like an open laptop may occlude the lower portions of the camera's view.

Figure 2:
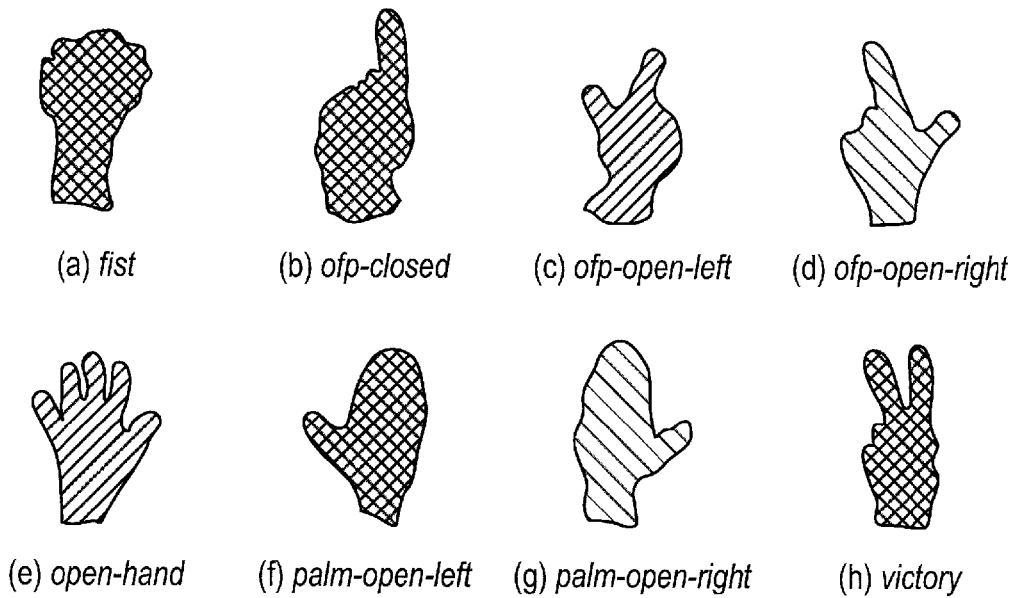
FIG. 2 depicts eight hand shapes, under an embodiment.

FIG. 2 depicts eight hand shapes, under an embodiment. Pose names that end in-left or -right are specific to that hand, while open and closed refer to whether the thumb is extended or tucked in to the palm. The "one finger point" (OFP) corresponds to the outstretched index finger.

The initial set of eight poses of an embodiment provides a range of useful interactions while maintaining relatively strong visual distinctiveness. For example, the combination of open-hand and first may be used to move a cursor and then grab or select an object. Similarly, the palm-open pose can be used to activate and expose more information (by "pushing" a graphical representation back in space) and then scrolling through the data with lateral hand motions.

Figure 3:
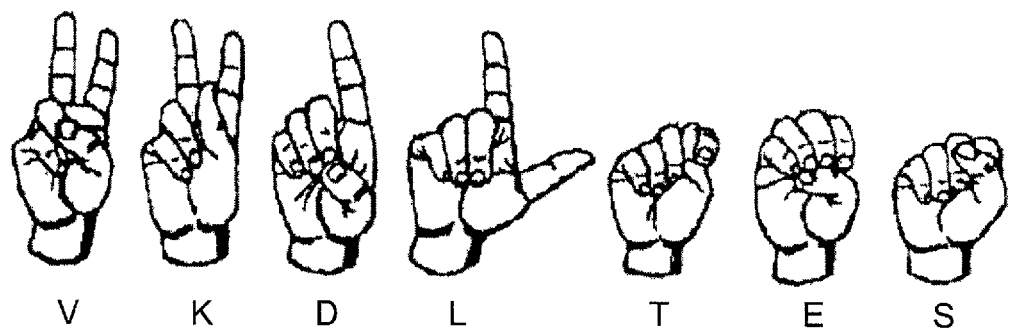
FIG. 3 shows signs from the American Sign Language (ASL) finger-spelling alphabet, which includes a much richer set of hand poses that covers 26 letters plus the digits zero through nine.

Other sets of hand shapes are broader but also require much more accurate and complete information about the finger configuration. For example, FIG. 3 shows signs from the American Sign Language (ASL) finger-spelling alphabet, which includes a much richer set of hand poses that covers 26 letters plus the digits zero through nine. These hand shapes make use of subtle finger cues, however, which can be difficult to discern for both the user and especially for the vision system.

Despite the fact that the gesture set of an embodiment is configured to be visually distinct, a large range of variation was seen within each shape class (see FIG. 4). Although a more accurate, higher-resolution depth sensor would reduce some of the intra-class differences, the primary causes are the intrinsic variations across people's hands and the perspective and occlusion effects caused by only using a single point of view. Physical hand variations were observed in overall size, finger width, ratio of finger length to palm size, joint ranges, flexibility, and finger control. For example, in the palm-open pose, some users would naturally extend their thumb so that it was nearly perpendicular to their palm and index finger, while other users expressed discomfort when trying to move their thumb beyond 45 degrees. Similarly, variation was seen during a single interaction as, for example, a user might start an palm-open gesture with their fingers tightly pressed together but then relax their fingers as the gesture proceeded, thus blurring the distinction between palm-open and open-hand.

Additionally, the SOE kiosk system can estimate the pointing angle of the hand within the plane parallel to the camera's sensor (i.e., the xy-plane assuming a camera looking down the z-axis). By using the fingertip, it notes a real (two-dimensional) pointing angle.

The central contribution of embodiments herein is the design and implementation of a real-time vision interface that works reliably across different users despite wide variations in hand shape and mechanics. The approach of an embodiment is based on an efficient, skeleton-free hand detection and tracking algorithm that uses per-frame local extrema detection combined with fast hand shape classification, and a quantitative evaluation of the methods herein provide a hand shape recognition rate of more than 97% on previously unseen users.

Detection and tracking of embodiments herein are based on the idea that hands correspond to extrema in terms of geodesic distance from the center of a user's body mass. This assumption is violated when, for example, a user stands with arms akimbo, but such body poses preclude valid interactions with the interface, and so these low-level false negatives do not correspond to high-level false negatives. Since embodiments are to be robust to clutter without requiring a pre-specified bounding box to limit the processing volume, the approach of those embodiments avoids computing global geodesic distance and instead takes a simpler, local approach. Specifically, extrema candidates are found by directly detecting local, directional peaks in the depth image and then extract spatially connected components as potential hands.

The core detection and tracking of embodiments is performed for each depth frame after subsampling from the input resolution of 640×480 down to 80×60. Hand shape analysis, however, is performed at a higher resolution as described herein. The downsampled depth image is computed using a robust approach that ignores zero values, which correspond to missing depth data, and that preserves edges. Since the depth readings essentially represent mass in the scene, it is desirable to avoid averaging disparate depth values which would otherwise lead to "hallucinated" mass at an intermediate depth.

Local peaks are detected in the 80×60 depth image by searching for pixels that extend farther than their spatial neighbors in any of the four cardinal directions (up, down, left, and right). This heuristic provides a low false negative rate even at the expense of many false positives. In other words, embodiments do not want to miss a real hand, but may include multiple detections or other objects since they will be filtered out at a later stage.

Figure 6:
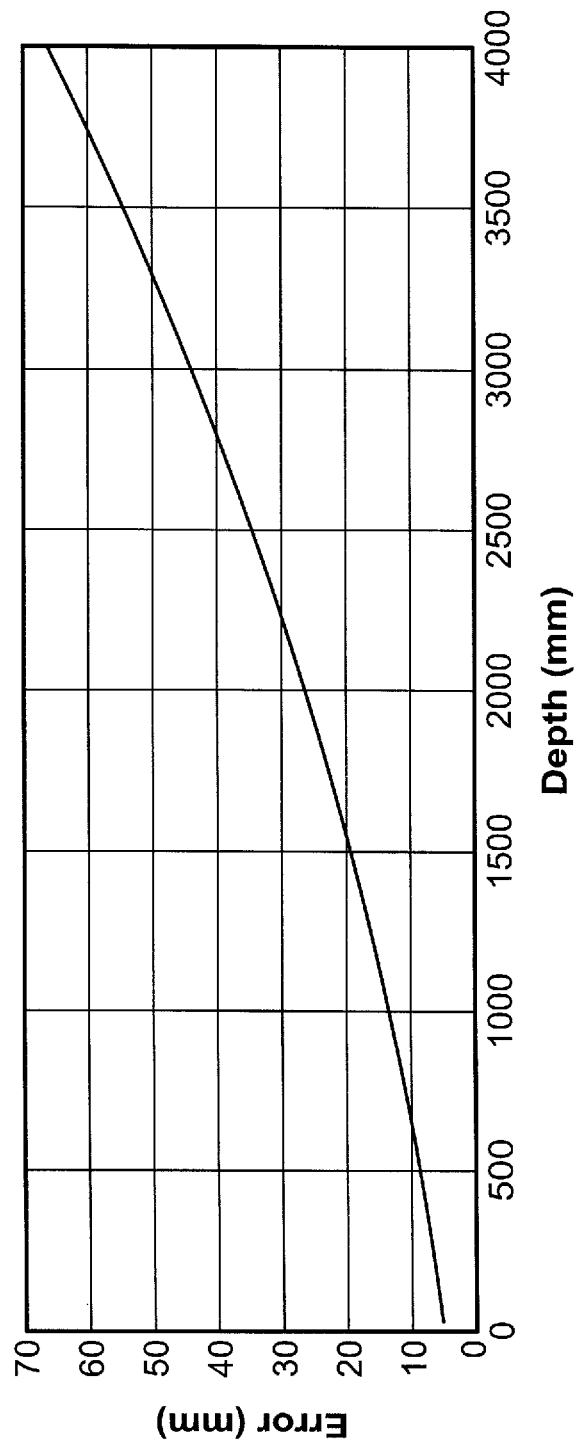
FIG. 6 shows a plot of the estimated minimum depth ambiguity as a function of depth based on the metric distance between adjacent raw sensor readings, under an embodiment.

Each peak pixel becomes the seed for a connected component ("blob") bounded by the maximum hand size, which is taken to be 300 mm plus a depth-dependent slack value that represents expected depth error. For the Microsoft Kinect, the depth error corresponds to the physical distance represented by two adjacent raw sensor readings (see FIG. 6 which shows a plot of the estimated minimum depth ambiguity as a function of depth based on the metric distance between adjacent raw sensor readings). In other words, the slack value accounts for the fact that searching for a depth difference of 10 mm at a distance of 2000 mm is not reasonable since the representational accuracy at that depth is only 25 mm.

The algorithm of an embodiment estimates a potential hand center for each blob by finding the pixel that is farthest from the blob's border, which can be computed efficiently using the distance transform. It then further prunes the blob using a palm radius of 200 mm with the goal of including hand pixels while excluding the forearm and other body parts. Finally, low-level processing concludes by searching the outer boundary for depth pixels that "extend" the blob, defined as those pixels adjacent to the blob that have a similar depth. The algorithm of an embodiment analyzes the extension pixels looking for a single region that is small relative to the boundary length, and it prunes blobs that have a very large or disconnected extension region. The extension region is assumed to correspond to the wrist in a valid hand blob and is used to estimate orientation in much the same way that Plagemann et al. use geodesic backtrack points (see for example, C. Plagemann, V. Ganapathi, D. Koller, and S. Thrun, Real-time identification and localization of body parts from depth images, IEEE International Conference on Robotics and Automation (ICRA), 2010).

The blobs are then sent to the tracking module which associates blobs in the current frame with existing tracks. Each blob/track pair is scored according to the minimum distance between the blob's centroid and the track's trajectory bounded by its current velocity. In addition, there may be overlapping blobs due to low-level ambiguity, and so the tracking module enforces the implied mutual exclusion. The blobs are associated with tracks in a globally optimal way by minimizing the total score across all of the matches. A score threshold of 250 mm is used to prevent extremely poor matches, and thus some blobs and/or tracks may go unmatched.

After the main track extension, the remaining unmatched blobs are compared to the tracks and added as secondary blobs if they are in close spatial proximity. In this way, multiple blobs can be associated with a single track, since a single hand may occasionally be observed as several separate components. A scenario that leads to disjoint observations is when a user is wearing a large, shiny ring that foils the Kinect's analysis of the projected structured light. In these cases, the finger with the ring may be visually separated from the hand since there will be no depth data covering the ring itself. Since the absence of a finger can completely change the interpretation of a hand's shape, it becomes vitally important to associate the finger blob with the track.

The tracking module then uses any remaining blobs to seed new tracks and to prune old tracks that go several frames without any visual evidence of the corresponding object.

Regarding hand shape recognition, the 80×60 depth image used for blob extraction and tracking provides in some cases insufficient information for shape analysis. Instead, hand pose recognition makes use of the 320×240 depth image, and so a determination is made as to which QVGA pixels correspond to each track. These pixels are identified by seeding a connected component search at each QVGA pixel within a small depth distance from its corresponding 80×60 pixel. The algorithm of an embodiment also re-estimates the hand center using the QVGA pixels to provide a more sensitive 3D position estimate for cursor control and other continuous, position-based interactions.

An embodiment uses randomized decision forests to classify each blob as one of the eight modeled hand shapes (see for example, L. Breiman, Random forests, Machine Learning, 45(1):5-32, 2001). Each forest is an ensemble of decision trees and the final classification (or distribution over classes) is computed by merging the results across all of the trees. A single decision tree can easily overfit its training data so the trees are randomized to increase variance and reduce the composite error. Randomization takes two forms: (1) each tree is learned on a bootstrap sample from the full training data set, and (2) the nodes in the trees optimize over a small, randomly selected number of features. Randomized decision forests have several appealing properties useful for real-time hand shape classification: they are extremely fast at runtime, they automatically perform feature selection, they intrinsically support multi-class classification, and they can be easily parallelized.

Methods of an embodiment make use of three different kinds of image features to characterize segmented hand patches. Set A includes global image statistics such as the percentage of pixels covered by the blob contour, the number of fingertips detected, the mean angle from the blob's centroid to the fingertips, and the mean angle of the fingertips themselves. It also includes all seven independent Flusser-Suk moments (see for example, J. Flusser and T. Suk, Rotation moment invariants for recognition of symmetric objects, IEEE Transactions on Image Processing, 15:3784-3790, 2006).

Fingertips are detected from each blob's contour by searching for regions of high positive curvature. Curvature is estimated by looking at the angle between the vectors formed by a contour point $C_i$ and its k-neighbors $C_{i-k}$ and $C_{i+k}$ sampled with appropriate wrap-around. The algorithm of an embodiment uses high curvature at two scales and modulates the value of k depending on the depth of the blob so that k is roughly 30 mm for the first scale and approximately 50 mm from the query point for the second scale.

Feature Set B is made up of the number of pixels covered by every possible rectangle within the blob's bounding box normalized by its total size. To ensure scale-invariance, each blob image is subsampled down to a 5×5 grid meaning that there are 225 rectangles and thus 225 descriptors in Set B (see FIG. 7 which illustrates features extracted for (a) Set B showing four rectangles and (b) Set C showing the difference in mean depth between one pair of grid cells).

Feature Set C uses the same grid as Set B but instead of looking at coverage within different rectangles, it comprises the difference between the mean depth for each pair of individual cells. Since there are 25 cells on a 5×5 grid, there are 300 descriptors in Set C. Feature Set D combines all of the features from sets A, B, and C leading to 536 total features.

As described herein, the blob extraction algorithm attempts to estimate each blob's wrist location by search for extension pixels. If such a region is found, it is used to estimate orientation based on the vector connecting the center of the extension region to the centroid of the blob. By rotating the QVGA image patch by the inverse of this angle, many blobs can be transformed to have a canonical orientation before any descriptors are computed. This process improves classification accuracy by providing a level of rotation invariance. Orientation cannot be estimated for all blobs, however. For example if the arm is pointed directly at the camera then the blob will not have any extension pixels. In these cases, descriptors are computed on the untransformed blob image.

Figure 5:
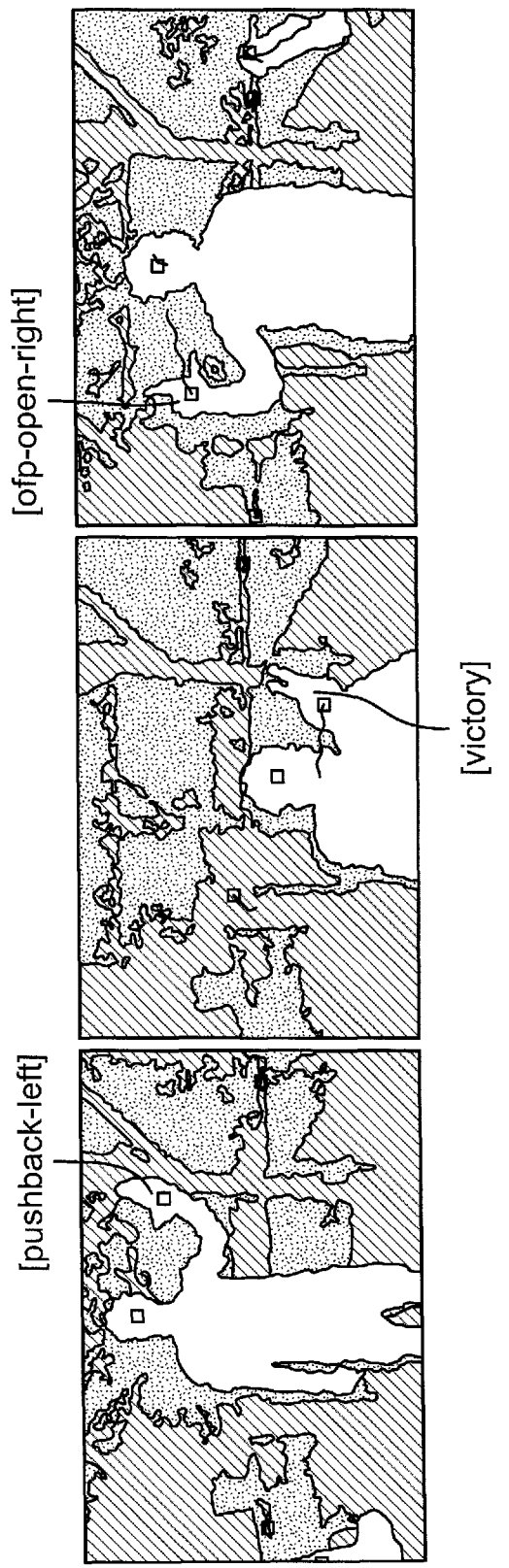
FIG. 5 shows several sample frames showing depth images along with tracking results, track history, and recognition results along with a confidence value, under an embodiment.

To evaluate the embodiments herein for real-time hand tracking and shape recognition, sample videos were recorded from 16 subjects (FIG. 5 shows several sample frames showing pseudo-color depth images along with tracking results (red squares), track history (white lines), and recognition results (text labels) along with a confidence value). The videos were captured at a resolution of 640×480 at 30 Hz using a Microsoft Kinect, which estimates per-pixel depth using an approach based on structured light. Each subject contributed eight video segments corresponding to the eight hand shapes depicted in FIG. 1. The segmentation and tracking algorithm described herein ran on these videos with a modified post-process that saved the closest QVGA blob images to disk. Thus the training examples were automatically extracted from the videos using the same algorithm used in the online version. The only manual intervention was the removal of a small number of tracking errors that would otherwise contaminate the training set. For example, at the beginning of a few videos the system saved blobs corresponding to the user's head before locking on to their hand.

Some of the hand poses are specific to either the left or right hand (e.g., palm-open-left) whereas others are very similar for both hands (e.g., victory). Poses in the second set were included in the training data twice, once without any transformation and once after reflection around the vertical axis. Through qualitative experiments with the live, interactive system, it was found that the inclusion of the reflected examples led to a noticeable improvement in recognition performance.

The 16 subjects included four females and 12 males ranging from 25 to 40 years old and between 160 and 188 cm tall. Including the reflected versions, each person contributed between 1,898 and 9,625 examples across the eight hand poses leading to a total of 93,336 labeled examples. The initial evaluation used standard cross-validation to estimate generalization performance. Extremely low error rates were found, but the implied performance did not reliably predict the experience of new users with the live system who saw relatively poor classification rates.

An interpretation is that cross-validation was over-estimating performance because the random partitions included examples from each user in both the training and test sets. Since the training examples were extracted from videos, there is a high degree of temporal correlation and thus the test partitions were not indicative of generalization performance. In order to run more meaningful experiments with valid estimates of cross-user error, a switch was made to instead use a leave-one-user-out approach. Under this evaluation scheme, each combination of a model and feature set was trained on data from 15 subjects and evaluated the resulting classifier on the unseen 16th subject. This process was repeated 16 times with each iteration using data from a different subject as the test set.

Figure 8:
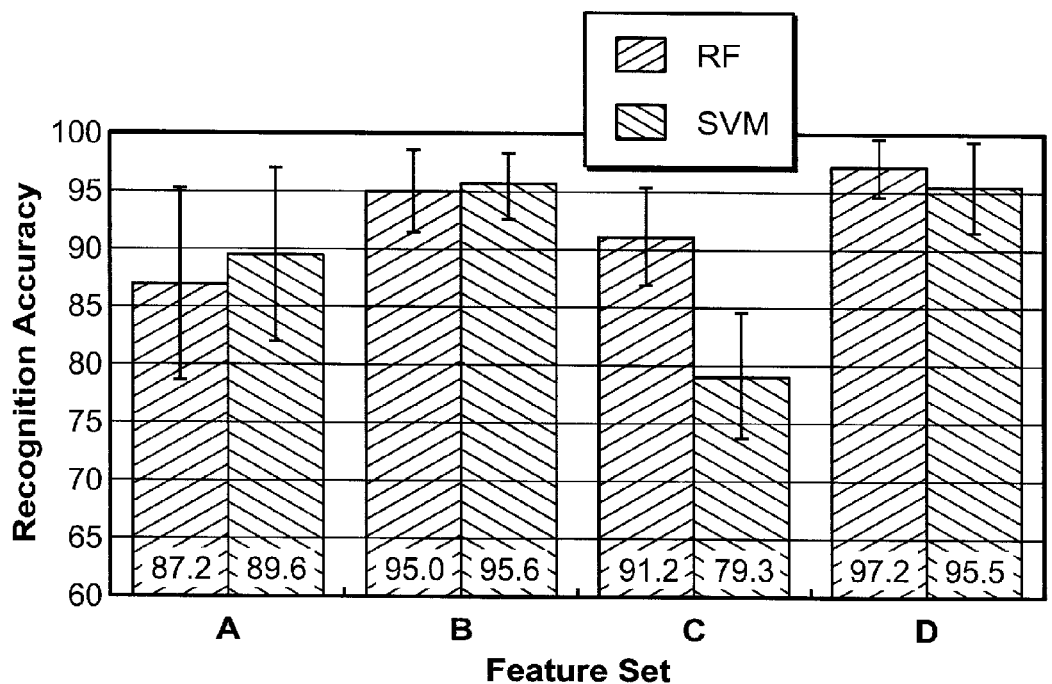
FIG. 8 is a plot of comparison of hand shape recognition accuracy for randomized decision forest (RF) and support vector machine (SVM) classifiers over four feature sets, under an embodiment.

FIG. 8 plots a comparison of hand shape recognition accuracy for randomized decision forest (RF) and support vector machine (SVM) classifiers over four feature sets, where feature set A uses global statistics, feature set B uses normalized occupancy rates in different rectangles, feature set C uses depth differences between points, and feature set D combines sets A, B, and C. FIG. 8 therefore presents the average recognition rate for both the randomized decision forest (RF) and support vector machine (SVM) models. The SVM was trained with LIBSVM and used a radial basis function kernel with parameters selected to maximize accuracy based on the results of a small search over a subset of the data (see for example, C.-C. Chang and C.-J. Lin, LIBSVM: A library for support vector machines, ACM Transactions on Intelligent Systems and Technology, 2:27:1-27:27, 2011). Both the RF and SVM were tested with the four feature sets described herein.

The best results were achieved with the RF model using Feature Set D (RF-D). This combination led to a mean cross-user accuracy rate of 97.2% with standard deviation of 2.42. The worst performance for any subject under RF-D was 92.8%, while six subjects saw greater than 99% accuracy rates. For comparison, the best performance using an SVM was with Feature Set B, which gave a mean accuracy rate of 95.6%, standard deviation of 2.73, and worst case of 89.0%.

Figure 9:
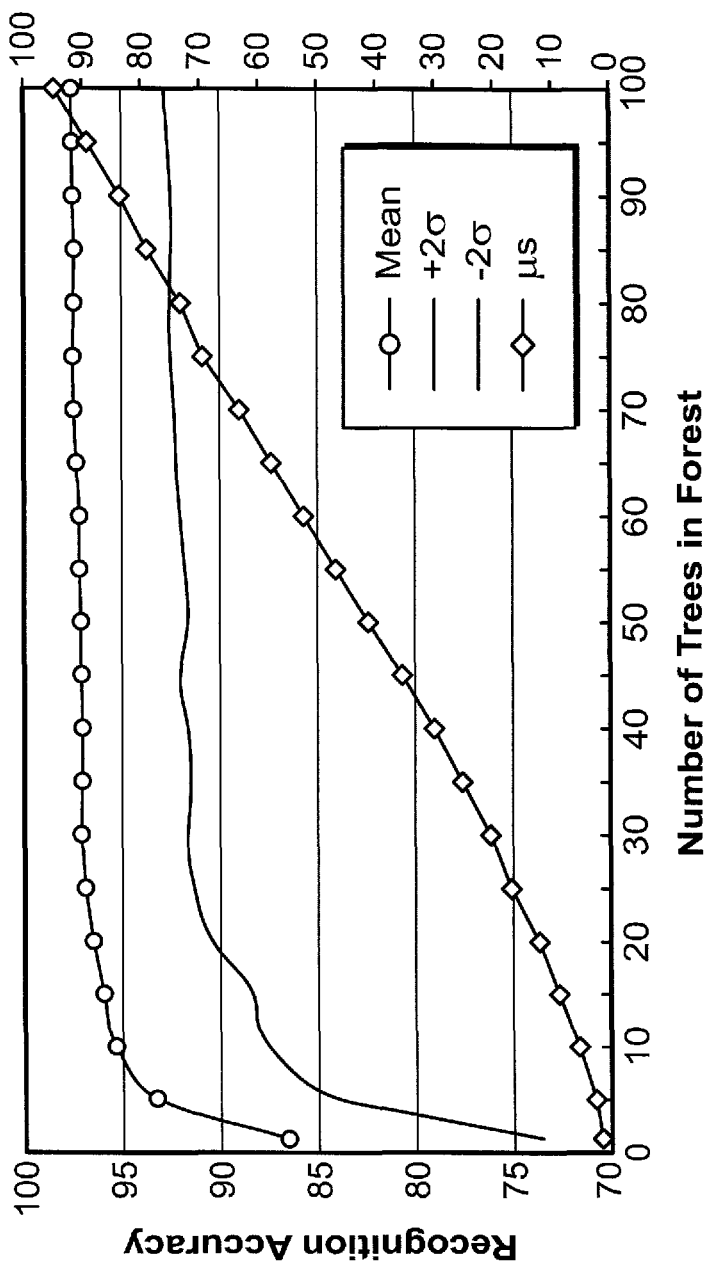
FIG. 9 is a plot of a comparison of hand shape recognition accuracy using different numbers of trees in the randomized decision forest, under an embodiment.

The RF results presented in FIG. 8 are based on forests with 100 trees. Each tree was learned with a maximum depth of 30 and no pruning. At each split node, the number of random features selected was set to the square root of the total number of descriptors. The ensemble classifier evaluates input data by merging the results across all of the random trees, and thus runtime is proportional to the number of trees. In a real-time system, especially when latency matters, a natural question is how classification accuracy changes as the number of trees in the forest is reduced. FIG. 9 presents a comparison of hand shape recognition accuracy using different numbers of trees in the randomized decision forest. The graph shows mean accuracy and ±2σ lines depicting an approximate 95% confidence interval (blue circles, left axis) along with the mean time to classify a single example (green diamonds, right axis). FIG. 9 shows that for the hand shape classification problem, recognition accuracy is stable down to 30 trees where it only drops from 97.2% to 96.9%. Even with 20 trees, mean cross-user accuracy is only reduced to 96.4%, although below this point, performance begins to drop more dramatically. On the test machine used, an average classification speed seen was 93.3 µs per example with 100 trees but only 20.1 µs with 30 trees.

Although higher accuracy rates might be desirable, the interpretation of informal reports and observation of users working with the interactive system of an embodiment is that the current accuracy rate of 97.2% is sufficient for a positive user experience. An error rate of nearly 3% means that, on average, the system of an embodiment can misclassify the user's pose roughly once every 30 frames, though such a uniform distribution is not expected in practice since the errors are unlikely to be independent. It is thought that the errors will clump but also that many of them will be masked during real use due to several important factors. First, the live system can use temporal consistency to avoid random, short-duration errors. Second, cooperative users will adapt to the system if there is sufficient feedback and if only minor behavioral changes are needed. And third, the user interface can be configured to minimize the impact of easily confused hand poses.

A good example of adapting the interface arises with the pushback interaction based on the palm-open pose. A typical use of this interaction allows users to view more of their workspace by pushing the graphical representation farther back into the screen. Users may also be able to pan to different areas of the workspace or scroll through different object (e.g., movies, images, or merchandise). Scrolling leads to relatively long interactions and so users often relax their fingers so that palm-open begins to look like open-hand even though their intent did not changed. An embodiment implemented a simple perception tweak that prevents open-hand from disrupting the pushback interaction, even if open-hand leads to a distinct interaction in other situations. Essentially, both poses are allowed to continue the interaction even though only palm-open can initiate it. Furthermore, classification confidence is pooled between the two poses to account for the transitional poses between them.

Experimentation was also performed with physical changes to the interface and workspace. For example, a noticeable improvement was seen in user experience when the depth camera was mounted below the primary screen rather than above it. This difference can stem from a tendency of users to relax and lower their hands rather than raise them due to basic body mechanics and gravity. With a bottom-mounted camera, a slightly angled or lowered hand provides a better view of the hand shape, whereas the view from a top-mounted camera will degrade. Similarly, advantage can be taken of users' natural tendency to stand farther from larger screens. Since the Kinect and many other depth cameras have a minimum sensing distance in the 30-80 cm range, users can be encouraged to maintain a functional distance with as few explicit reminders and warning messages as possible. The interface of an embodiment does provide a visual indication when an interaction approaches the near sensing plane or the edge of the camera's field of view, but implicit, natural cues like screen size are much preferred.

As stated in the '124 application, other markerless research has focused on skeleton systems. As an SOE expression, the kiosk system in contrast focuses on tracking and detection of finger and hands. The human hand represents an optimal input candidate in the SOE. Nimble and dexterous, its configurations make full use of the system's volume. Furthermore, a key value of the SOE is the user's conviction of causality. In contrast to systems whose gesture vocabulary is flat or static primarily, the kiosk system achieves spatial manipulation with dynamic and sequential gestures incorporating movement along the depth dimension.

In a characterization of latency under an embodiment, processing algorithms add roughly 10 milliseconds (ms) of latency with experiments showing a range from 2 to 30 ms (e.g., mean approximately 8.5 ms, standard deviation approximately 2.5 ms, minimum approximately 2 ms, maximum approximately 27 ms) depending on scene complexity.

Figure 10:
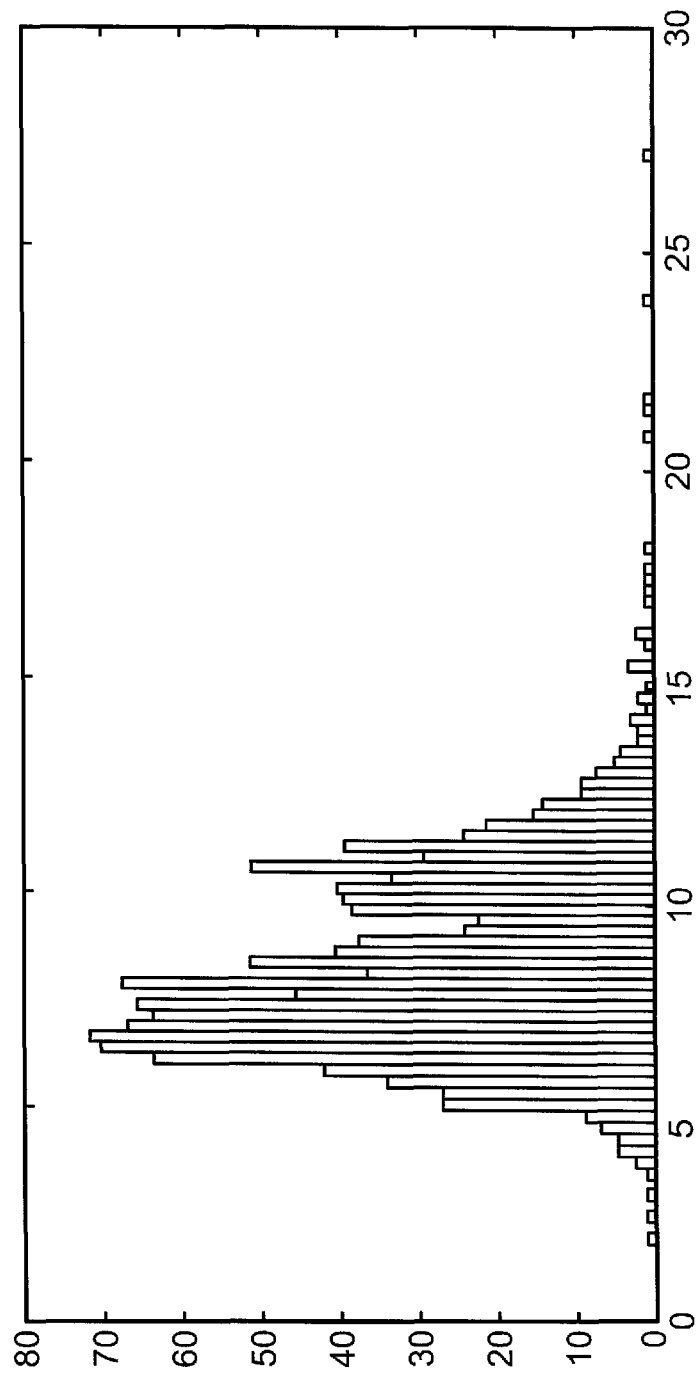
FIG. 10 is a histogram of the processing time results (latency) for each frame using the tracking and detecting component implemented in the kiosk system, under an embodiment.
Figure 16B:
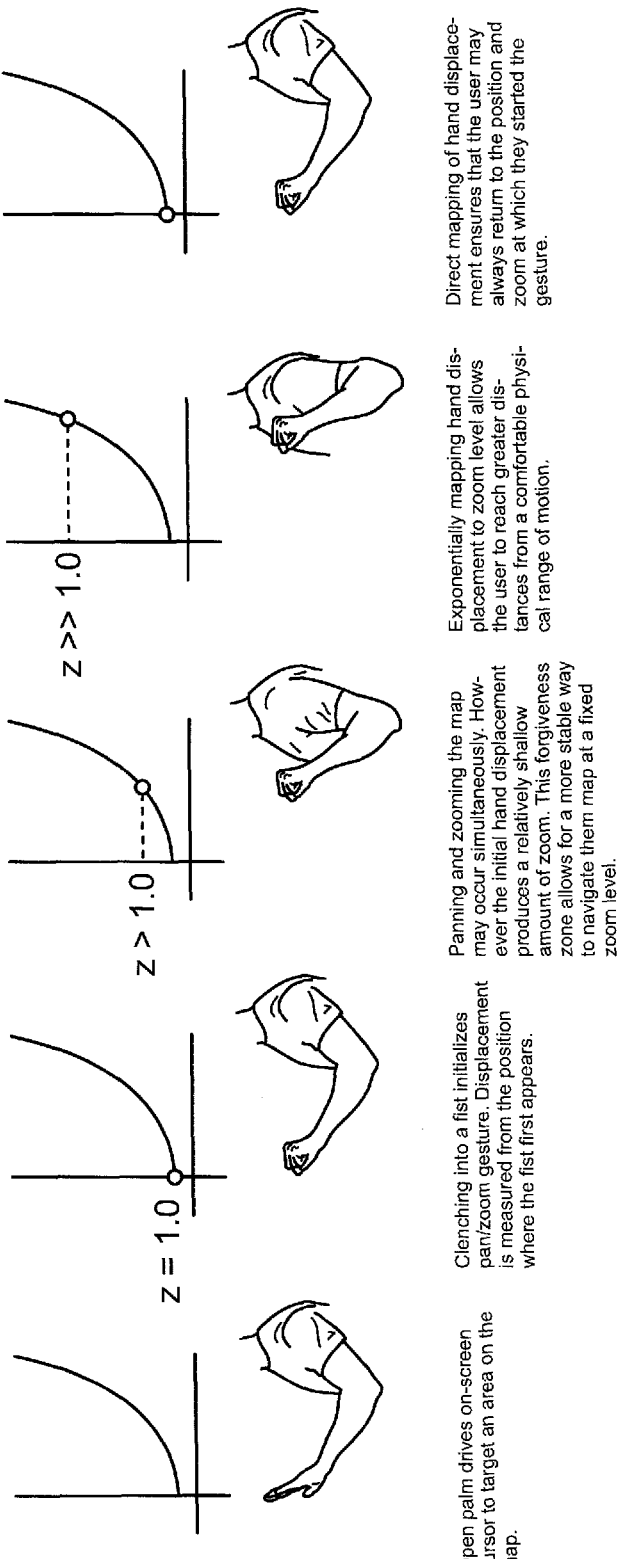
Figure 16C:
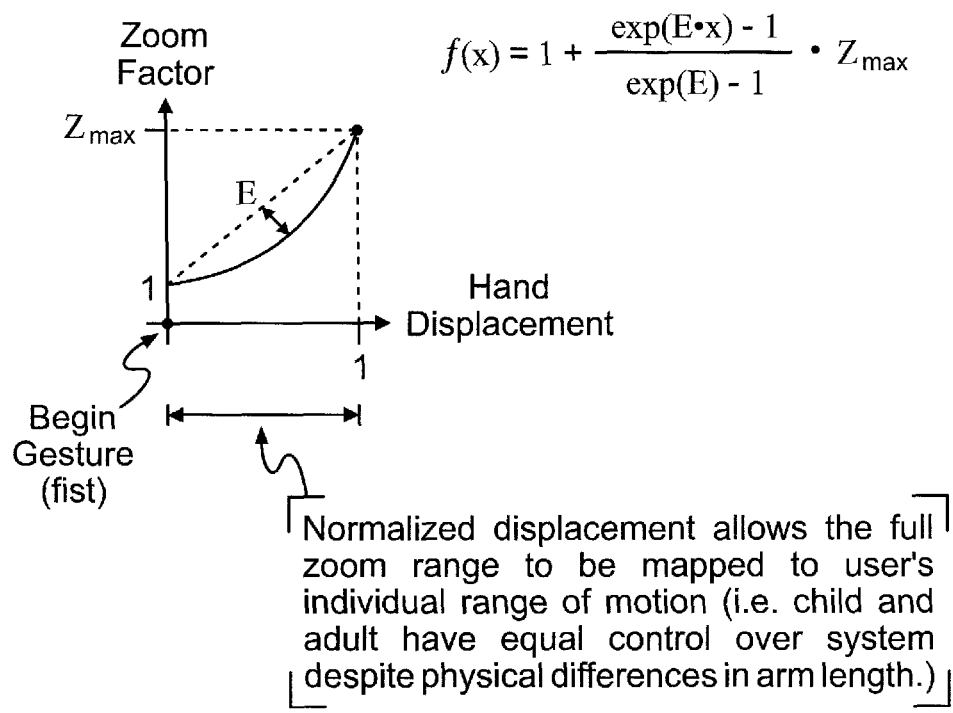
Figure 16D:
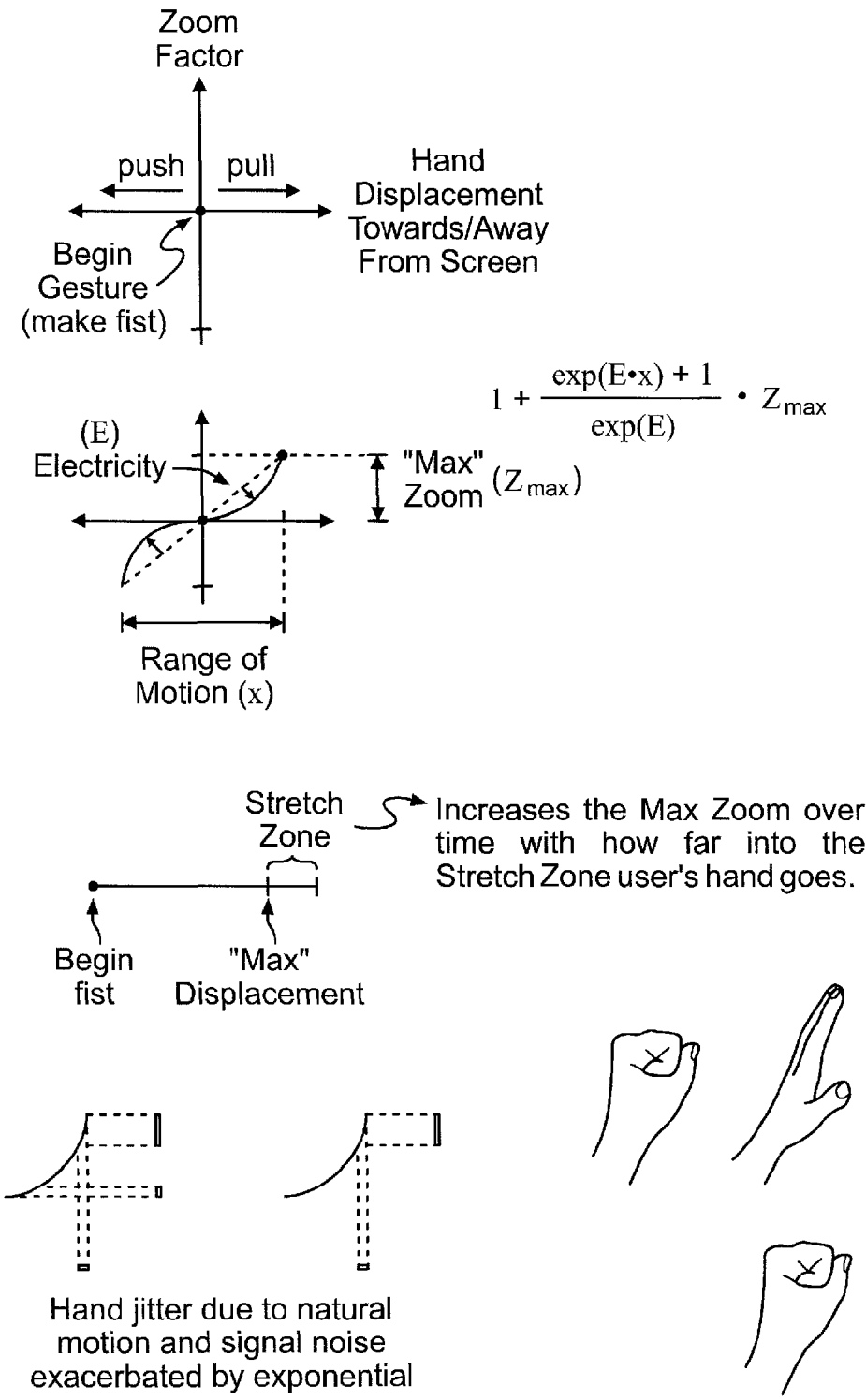

Experiments with embodiments reflected representative scenarios (e.g., one user, no clutter; one user with clutter; two users, no clutter). Results were estimated from 1,287 frames of data, in a typical hardware set-up (Quad Core Xeon E5506 running at 2.13 Ghz.). FIG. 10 is a histogram of the processing time results (latency) for each frame using the tracking and detecting component implemented in the kiosk system, under an embodiment. Results do not include hardware latency, defined as time between capture on the camera and transfer to the computer. Results also do not include acquisition latency, defined as time to acquire the depth data from the driver and into the first pool, because this latter value depends on driver implementation, and experiments were staged on the slower of the two drivers supported in kiosk development.

The achieved latency of an embodiment for processing hand shapes is novel, and translates to interactive latencies of within one video frame in a typical interactive display system. This combination of accurate hand recognition and low-latency provides the seamless experience necessary for the SOE.

In addition to the embodiments presented in the '124 application, noted here is one addition to the capabilities of the algorithm and its implementation. The system can estimate the pointing angle of the hand within the plane parallel to the camera's sensor (i.e., the xy-plane assuming a camera looking down the z-axis). By using the fingertip, it notes a real (two-dimensional) pointing angle.

:Gestures of an SOE in a Kiosk

The '689 application describes an input gesture language; it defines a gesture vocabulary string, referenced here, and illustrated in the figures herein. FIG. 11 is a diagram of poses in a gesture vocabulary of the SOE. FIG. 12 is a diagram of orientation in a gesture vocabulary of the SOE, under an embodiment. The markerless system recognizes at least the following nine gestures:

(1) GrabNav, Pan/Zoom—In a dynamic sequence, an open hand (VV-:x^) or open palm (||||-:x^) pushes along the x-axis and then transitions to a fist (^^^^>).

(2) Palette—A one-finger-point-open pointing upward toward ceiling (ofp-open, ^^^|->:x^, gun, L) transitions to a thumb click.

(3) Victory—(^V>:x^) is a static gesture.

(4) Goal-Post/Frame-It—Two ofp-open hands with the index fingers parallel point upward toward the ceiling (^^^|->:x^) and (^^^|-:x^)

(5) Cinematographer—In a two-handed gesture, one ofp-open points with index finger pointing upward (^^^|-:x^). The second hand, also in ofp-open, is rotated, such that the index fingers are perpendicular to each other (^^^|-x^).

(6) Click left/right—In a sequential gesture, an ofp-open (^^^|-:x^) is completed by closing thumb (i.e., snapping thumb "closed" toward palm).

(7) Home/End—In a two-handed sequential gesture, either opf-open (^^^|-:x^) or pfp-closed (^^^|>:x^) points at fist (^^^: x^) with both hands along a horizontal axis.

(8) Pushback—U.S. patent application Ser. No. 12/553, 845 delineates the pushback gesture. In the kiosk implementation, an open palm (|||-:x^) pushes into the z-axis and then traverses the horizontal axis.

(9) Jog Dial—In this continuous, two-handed gesture, one hand is a base and the second a shuttle. The base hand is ofp-open pose (^^^|-:x^), the shuttle hand ofp-closed pose (^^^|>:x^).

These gestures are implemented as described in detail herein and as shown in FIGS. 13-15:

Application: Spatial Mapping includes gestures (1) through (5) above—FIG. 13 is an example of commands of the SOE in the kiosk system used by the application spatial mapping, under an embodiment;

Application: Media Browser includes gestures (4) through (9) above—FIG. 14 is an example of commands of the SOE in the kiosk system used by the application media browser, under an embodiment;

Application: Edge Application Suite::Upload/Pointer/Rotate includes gestures (3), (8) above—FIG. 15 is an example of commands of the SOE in the kiosk system used by applications including upload, pointer, rotate, under an embodiment.

:Applications

Five applications are described herein as examples, but embodiments of the SOE kiosk are not limited to these applications. Implementing the SOE in a markerless setting, these applications achieve novel work and reflect different capabilities and priorities:

(1) Spatial mapping—robust manipulation of complex data sets including integration of external data sets;

(2) Media browser—fluid, intuitive control of light footprint presentations.

iOS suite of three applications—seamless navigation between kiosk applications; as individual applications, integration of iOS input elements:

(3) Rotate;
(4) Upload;
(5) Pointer.

These applications realize the SOE approach within the particularities of the markerless setting. To provide low barrier to entry in terms of installation, portability, and free agency, the kiosk works with reduced sensing resources. The Kinect sensor, for example, provides frame rate of 30 Hz; a system described in earlier filings, gloves read by a Vicon camera, is characterized by 100 Hz. Within this constraint, the kiosk achieves low-latency and reliable pose recognition with its tracking and detecting system.

The design and execution of applications presented herein are examples only and do not limit the embodiments herein to particular applications, but instead serve to express the novelty of the SOE. Specifically, applications structure allocation of the spatial environment; they render appropriately how the user fills the geometrical space of the SOE. Stated in terms of user value, the applications then achieve a seamless, comfortable implementation, where the user fully makes use of the volume of the SOE. Similarly, the applications structure visual elements and feedback on screen—certainly for appropriate visual presence and, more fundamentally for the SOE, for a spatial manipulation that connects user gesture and system response.

Broadly stated, the applications presented herein sustain the user's experience of direct spatial manipulation; her engagement with three-dimensional space; and her conviction of a shared space with graphics. So that the user manipulates data as she and graphics were in the same space, the applications deploy techniques described below including but not limited to broad gestures; speed threshold; dimension-constrained gestures; and falloff.

In regard to architecture, the applications herein leverage fully the interoperability approach of the SOE. Applications can display data regardless of technology stack/operating system. Similarly, applications can make use of low-level data from edge devices such as an iPhone, for example. To connect an edge device to a desired SOE, the user downloads the relevant g-speak application. The description herein describes functionality provided by the g-speak pointer application, which is representative without limiting the g-speak applications for the iOS or any other client.

As described in the '263 application, regardless of input device, the SOE accepts events deposited by proteins into its pool architecture. Similarly, the SOE kiosk integrates data from iOS devices using the proteins and pool architecture.

The applications described herein leverage feedback built into the kiosk stack. When a user's gesture moves beyond the range of the sensor at the left and right edges, as well as top and bottom, the system can signal with a shaded bar along the relevant edge. For design reasons, the applications provide feedback for movement beyond the left, right, and top edge.

Applications: Spatial Mapping

The spatial mapping application (also referred to herein as "s-mapping" or "s-map") provides navigation and data visualization functions, allowing users to view, layer, and manipulate large data sets. Working within the SOE built on a real-world geometry, s-map brings to bear assets suited to spatial data rendering. With this SOE framework, spatial mapping provides three-dimensional manipulation of large datasets. As it syncs data expression with interface, the user's interaction of robust data becomes more intuitive and impactful.

Such rendering pertains to a range of data sets as described herein. The descriptions herein invoke a geospatial construct (the scenario used in the application's development).

The application provides a combination of approaches to how the user interacts with spatial data. As a baseline, it emphasizes a particular perception of control. This application directly maps a user's movements to spatial movement: effected is a one-to-one correlation, a useful apprehension and control where stable manipulation is desired. (Direct data location, a key value in any scenario, can be particularly useful for an operator, for example, of a geospatial map.) At the same time, s-map makes available rapid navigation features, where a user quickly moves through large data sets. So that the effects of her input are multiplied, the application correlates input to acceleration through spatial data. In its provision of gestures for stable manipulation and rapid navigation, s-mapping takes into account not only user motion and comfort, but also function. As described herein, the application corresponds the gesture to the kind of work the user undertakes. The SOE therefore provides a seamless throughput from user to data. The user's manipulations are the data commands themselves.

::Filtering

The application of an embodiment opens displaying its home image such as, in the example used throughout this description, a map of earth. When the user presents the input hand element, the tracking and detection pipeline provides gesture data. The application additionally filters this data. Raw spatial movements are passed through a simple, first-order, low-pass filter before being applied to any interface elements they are driving.

::Navigating Data Sets

The user can navigate this home image, and subsequent graphics, with a sequence of gestures two-fold in effect. This sequence is referred to with terms including grab/nav and pan/zoom. Throughout the application, the "V" gesture (^^V>:x^) initiates a full reset. The map zooms back to its "home" display (the whole earth, for example, in the geospatial example begun above).

First, the user "grabs" the map. An open hand (VV-:x^) or open palm (||||-:x^) moves a cursor across the lateral plane to target an area. A transition to a fist (^^^>:x^) then locks the cursor to the map. The user now can "drag" the map: the fist traversing the frontal plane, mapped to the image frame, moves the map. In a function analogous to pushback (comments below), pan/zoom correlates movement along the depth dimension to other logical transformations.

In the pan/zoom sequence, the user pushes the fist (^^^>:x^) toward the screen to effect a zoom: the visible area of the map is scaled as to display a larger data region. Throughout the gesture motion, data frame display is tied to zoom level. Data frames that most clearly depict the current zoom level stream in and replace those too large or too small as the map zooms. Similarly, as the user pulls the fist away from the screen, the map scales towards the area indicated, displaying a progressively smaller data region. Additionally, the user may pan the visible area of the map by displacing the fist within the frontal plane, parallel with the map. Lateral fist movements pan the map to the right and left while vertical fist movements pan up and down.

The sensing environment of the kiosk, limited, would misinterpret this transition from open hand to fist. As the user rapidly traverses the lateral plane, the sensor interprets the palm, blurred, as a fist. To secure functionality, the application incorporates a speed threshold into the gesture. Rapid movement does not trigger detection of fist, and its subsequent feedback. Instead, the design requires intentional engagement: if a certain speed is exceeded in lateral movement, the application interprets the movement as continued. It does not jump into "fist" recognition.

The fist gesture itself provides two benefits. First, as a broad gesture it works within the precision field of the sensor. At the same time it provides a user benefit. The design effect sought with grab is visceral: the user "secures" or "locks" her dataspace location. Even with a sensor such as Microsoft Kinect, which does not allow pixel-accurate detection, the user is able to select map areas accurately.

As a tool for manipulating large data sets, s-mapping juxtaposes this lock step with nimble movement. Working with extensive data sets, the user needs to push through broad ranges. The user with a map of the earth might jump from the earth level, to country, state, and city.

Direct mapping would compromise this sweep through data. Therefore, the gesture space of the system of an embodiment limits the range of the gesture. Furthermore, the tolerances of the user limit the gesture range of an embodiment. Typically, a user moves her hands comfortably only within a limited distance. Imprecision encroaches upon her gesture, destabilizing input.

Conforming gestures to usability parameters is a key principle and design execution of the SOE. For robust navigation through large data sets, the application uses "falloff," a technique of non-linear mapping of input to output. It provides an acceleration component as the user zooms in or out of a data range.

The system measures displacement from the position where the fist first appears. Since it remembers the origin of z-displacement, the user can return to the position where she started her zoom gesture. While the application supports simultaneous pan and zoom, initial hand offset yields a limited effect. This buffer zone affords stable navigation at a fixed zoom level.

The application then exponentially maps z-displacement of the hand to zoom, as related in FIGS. 16A-16D which describe aspects of mapping hand displacement to system zoom, under an embodiment. As the figures state, the system increases the maximum zoom over time with respect to the depth range attained in the user's gesture. Normalized displacement allows the user's individual range of motion to effect the full zoom range. For example, a child and an adult have equal control over the system, regardless of physical differences in arm length. As depicted in FIGS. 16A-16D, because exponential mapping compounds jitter associated with hand movement, the system increases the filter strength.

In its effect, the mapping application recalls a key functionality of pushback, whereby the user quickly procures context within a large dataset. The '845 application contextualizes and describes the gesture in detail. Pushback relates movement along the depth dimension to translation of the dataspace along the horizontal axis. The user's movement along the depth dimension triggers a z-axis displacement of the data frame and its lateral neighbors (i.e., frames to the left and right). In s-map, the map remains spatially fixed and the user's movement is mapped to the logical zoom level, or "altitude factor." As stated, panning and zooming can occur simultaneously in the application. Components such as "dead space" and glyph feedback, which do not figure in s-map, are included in the media browser application described later in this document.

::Layering Data Sets

The second provision of s-map is in its visualization of multiple data sets. With the proliferation of complex, large data sets, the navigation of individual ranges is followed effectively by the question of their juxtaposition. The application combines access to data sets with their fluid layering.

The '263 application describes how the SOE is a new programming environment. A departure from traditional interoperation computing, it integrates manifold and fundamentally different processes. It supports exchange despite differences in data type and structure, as well as programming language. In the mapping application, the user then can access and control data layers from disparate sources and systems. For example, a geospatial iteration may access a city-state map from a commercial mapping vendor; personnel data from its own legacy system; and warehouse assets from a vendor's system. Data can be stored locally or accessed over the network.

The application incorporates a "lens" feature to access this data. Other terms for this feature include but are not limited to "fluoroscope." When laid onto a section of map, the lens renders data for that area. In a manner suggested by "lens" label, the area selected is seen through the data lens. The data sets appear on the left side of the display in a panel (referred to as "pane," "palette," "drawer," and other similar terms). S-map's design emphasizes the background map: the visual drawer only is present when in use. (This is in line with the SOE emphasis on graphics as manipulation, and its demotion of persistent menus that might interfere with a clean spatial experience.)

The gesture that pulls up this side menu mirrors workflow. First, an ofp-open (^^^|-:x^) triggers a vertical menu to display on the left side of the screen. The call is ambidextrous, summoned by the left or right hand. Then, vertical motion moves within selections, and finally, a click with the thumb or ratchet-rotation of the wrist fixes the selection. When moving up or down for selection, only the y-axis contributes to interface response. Incidental x- and z-components of the hand motion make no contribution. This lock to a single axis is an important usability technique employed often in SOE applications.

This design reflects two principles of the system. Aligning with workflow, the sequence is designed to correlate with how the user would use the gestures. Second, their one-dimensional aspect allows extended use of that dimension. While the SOE opens up three dimensions, it strategically uses the components of its geometry to frame efficient input and create a positive user experience.

During this selection process, as throughout the program, the user can reset in two ways. As noted herein, the "V" gesture (^^V>:x^) yields a full reset. The map zooms back to its "home" display (the whole earth, for example, in the geospatial example begun above. Any persistent lenses fade away and delete themselves. The fist gesture accomplishes a "local" reset: if the user has zoomed in on an area, the map retains this telescoped expression. However, by forming the fist gesture, the lens will fade away and delete itself upon escaping the gesture. In both the "V" and fist reset, the system retains memory of the lens selection, even as physical instances of the lens dissipate. The user framing a lens after reset creates an instance of the lens type last selected.

The fist gesture, as described herein, is the "grab" function in navigation. With this gesture recall, the interface maintains a clean and simple feel. However, the application again designs around user tolerances. When forming a fist, one user practice not only curls the finger closed, but then also drops the hand. Since the application deploys direct mapping, and the fist gesture "grabs" the map, the dropping hand yanks the map to the floor. Again, a speed threshold is incorporated into the gesture: a user exceeding a certain speed does not trigger grab. Instead the system interprets the fist as reset.

::Layering Data Sets:::Overlaying

After selecting a data set, the user creates and uses a layer in three ways: (1) moving it throughout the map; (2) resizing the lens; and (3) expanding it to redefine the map. To engage these actions, the user instantiates a lens. Again following workflow, the gesture after selection builds on its configuration of either left or right opf-open hand. To render the selected lens, the second hand is raised in "frame-it" (appearing like a goal-post). It uses two ofp-open hands with the index fingers parallel and pointing toward the ceiling (^^^|-:x^) and (^^^|-:x^). The gesture segues cleanly from the palette menu gesture, easily extending it.

This data lens now can be repositioned. As described herein, as the user moves it, the lens projects data for the area over which it is layered. The user may grow or shrink the size of the lens, by spreading her hands along the lateral base of her "frame" (i.e., along the x-axis, parallel to the imaginary line through her outstretched thumbs). The default fluoroscope expression is a square, whose area grows or shrinks with resizing. The user can change the aspect ratio by rotating "frame-it" ninety degrees. In function, this "cinematographer" gesture (^^^|-:x^) and (^^^|-:x-) is equivalent to "frame-it." Feature-wise, though, the user can set aspect ratio by resizing the rectangle formed by his hands.

This "frame-it"—as a follow-up gesture—is more advanced, and is leveraged fully by a "pro" user, who optimizes for both feature and presentation. The SOE gestural interface is a collection of presentation assets: gestures are dramatic when performed sharply and expressing full-volume when possible. The pro user can swing this cinematographer frame in a big arc, and so emphasize the lens overlay. The rich gestural interface also lets the user fine-tune his gestures as he learns the tolerances of the system. With these sharp or dramatic gestures, he can optimize his input.

The fluoroscope can engage the screen—and so express its data there—in three ways:

(1) For the data layer to subsume the entire screen (shifting into "fullscreen" mode), the user spreads his hands. Beyond a threshold distance, the lens shifts into fullscreen mode where it subsumes the entire screen.

(2) To fix the data layer to the map, the user pushes the lens "onto" the map; i.e. pushing toward the screen. The user, for example, can assign the lens to a particular area, such as a geographic region. As the user moves the map around, the lens remains fixed to its assigned area.

(3) To fix the data layer to the display, the user pulls the lens toward him. The lens, affixed to the display, floats above the background image. As the user moves the map around, the map reveals data when moved underneath the lens.

This pushing or pulling snaps the lens onto, respectively, the map or the display. The sequence from resizing to snapping is an illustration of how the application uses the building blocks of the SOE geometry. As with lens selection (when gestures expressed/constrained within one dimension called up the palette), lens resizing also occurs within one plane, i.e. frontal. The z-axis then is used for the snap motion.

These gestures for data layering are designed around user practice for two reasons. First, when a user "frames" a lens, the design considered how quickly the user wanted to slide his hands together/apart. The comfortable and expressive range of motion is measured in terms of actual space. To reflect how far the body wants to move, the application can be adjusted or adapted per user, per gesture. In addition to enhancing the user experience, this approach is output agnostic. The size of the screen does not affect the gesture expression. This decoupling, where the user's movement is constant, facilitates porting the application.

As the user selects and implements lenses, overlay can incorporate transparency. Topology data is an example of a lens that makes use of transparency. The system composites lenses on top of the base map and other layers, incorporating transparency as appropriate.

::Edge Devices

Finally, as an SOE agent, s-map allows the option of incorporating low-level data from edge devices (as defined in "Context" above). This includes "pointer" functionality, where the application makes use of inertial data from a device such as an iPhone, which has downloaded the g-speak pointer application for the iOS client. Pointing the phone at the screen, and holding a finger down, any user within the SOE area can track a cursor across the display.

Applications:Media Browser

The media browser is built to provide easy use and access. It reflects the organic adaptability of the SOE: while its engineering enables dynamic control of complex data sets, its approach naturally distills in simpler expressions. A complete SOE development space, the kiosk supports applications suitable for a range of users and operational needs. Here, the browser allows intuitive navigation of a media deck.

On initiation, the application opens to a home slide with a gripe "mirror" in the upper right hand area. A system feedback element, this mirror is a small window that indicates detected input. The information is anonymized, the system collecting, displaying, or storing no information particular to users outside of depth. The mirror displays both depth information and gripe string. The feedback includes two benefits. First, the application indicates engagement, signaling to the user the system is active. Second, the mirror works as an on-the-spot debugging mechanism for input. With the input feedback, the user can see what the system interprets her as doing.

::Non-Scrolling Gestures/Function

At its start no one gesture is required to initiate action. The user can provide input as necessary to his function, which include but are not limited to the following:
  previous/next—the user "clicks" left or right to proceed through the slides one-by-one;
  home/end—the user jumps to first or last slide;
  overview—the user can view all slides in a grid display and select;
  velocity-based scrolling—the user rapidly scrolls through a lateral slide display.

The inventory herein lists gestures by name and correlating function, and then describes the system input.

To proceed through the slides one-by-one, the user "clicks" left/right for previous/next. The gesture is a two-part sequence. The first component is ofp-open (^^^|-:x^); its orientation indicates direction:
  pointing up with the left hand moves left, to the previous slide
  pointing up with the right hand moves right, to the next slide
  pointing left or right (with the index finger parallel to the ground) moves in the direction of the point The application provides visual feedback on the user's input. This first part of the gesture prompts oscillating arrows. Appearing on the relevant side of the screen, the arrows indicate the direction the browser will move, as defined by the user's orientation input. The second part of the gesture "clicks" in that direction by closing the thumb (^^^||:x^ or ^^^|>:x^). Visual feedback is also provided including but not limited to:
  arrows slightly darken to indicate possible movement;
  red block flashes to indicate user is at either end of slide deck.

To jump to the first or last slide, the user points to his fist, both hands along a horizontal axis. The system accepts pointing either open (^^^|-:x^) or closed (^^^|>:x^). The pointing direction determines direction. Pointing left (toward left fist) jumps to first slide. Pointing right (toward right fist) jumps to last slide.

With the overview function, the browser displays all slides in a grid. To enter overview, the user points both hands in the cinematographer gesture. Either cinematographer or goal post exits the user from overview, back to the last displayed slide. Pushback lets the user scroll across slides and select a different one to display in the sequential horizontal deck.

::Scrolling Gestures/Functions:::Pushback

The scrolling function of the browser lets a user rapidly and precisely traverse the horizontal collection of slides that is the deck. Two gestures—pushback and jog-dial—enact capabilities analogous to scrolling. Their descriptions herein include comments on how the media browser application allocates space, on behalf of the user, and correlates user movement to graphics display.

The '845 application describes how pushback structures user interaction with quantized—"detented"—spaces. By associating parameter-control with the spatial dimension, it lets the user acquire rapid context. Specifically, in the media browser, the slides comprising elements of the data set are coplanar and arranged laterally. The data space includes a single natural detent in the z-direction and a plurality of x-detents. Pushback links these two.

The pushback schema divides the depth dimension into two zones. The "dead" zone is the half space farther from the display; the "active" zone is that closer to the display. Along the horizontal plane, to the left and right of the visible slide are its coplanar data frames, regularly spaced.

The user, when on a slide, forms an open palm (||||-:x^). The system, registering that point in space, displays a reticle comprising two concentric glyphs. The smaller inner glyph indicates the hand is in the dead zone. The glyph grows and shrinks as the user moves his hand forward and back in the dead zone. In order to expand available depth between his palm and screen, the user can pull his hand back. The inner glyph reduces in size until a certain threshold is reached, and the ring display stabilizes.

At any time the user can push into the z-axis. When he crosses the threshold separating dead zone from active, the system triggers pushback. The system measures the z-value of the hand relative to this threshold, and generates a correspondence between it and a scaling function described herein. The resulting value generates a z-axis displacement of the data frame and its lateral neighbors. The image frame recedes from the display, as if pushed back into perspective. In the media browser the effect is the individual slide receding into the sequence of slides. As the user pushes and pulls, the z-displacement is updated continuously. The effect is the slide set, laterally arranged, receding and verging in direct response to his movements.

The glyph also changes when the user crosses the pushback threshold. From scaling-based display, it shifts into a rotational mode: the hand's physical z-axis offset from the threshold is mapped into a positive (in-plane) angular offset. As before, the outer glyph is static; the inner glyph rotates clockwise and anti clockwise, relating to movement toward and away from the screen.

The user entering the active zone triggers activity in a second dimension. X-axis movement is correlated similarly to x-displacement of the horizontal frame set. A positive value corresponds to the data set elements—i.e., slides—sliding left and right, as manipulated by the user's hand. In the media browser, as the user scrolls right, the glyph rotates clockwise. Scrolling left, the glyph rotates counterclockwise. The user exits pushback and selects a slide by breaking the open-palm pose. The user positions the glyph to select a slide: the slide closest to glyph center fills the display. The frame collect springs back to its original z-detent, where one slide is coplanar with the display.

Figure 17A:
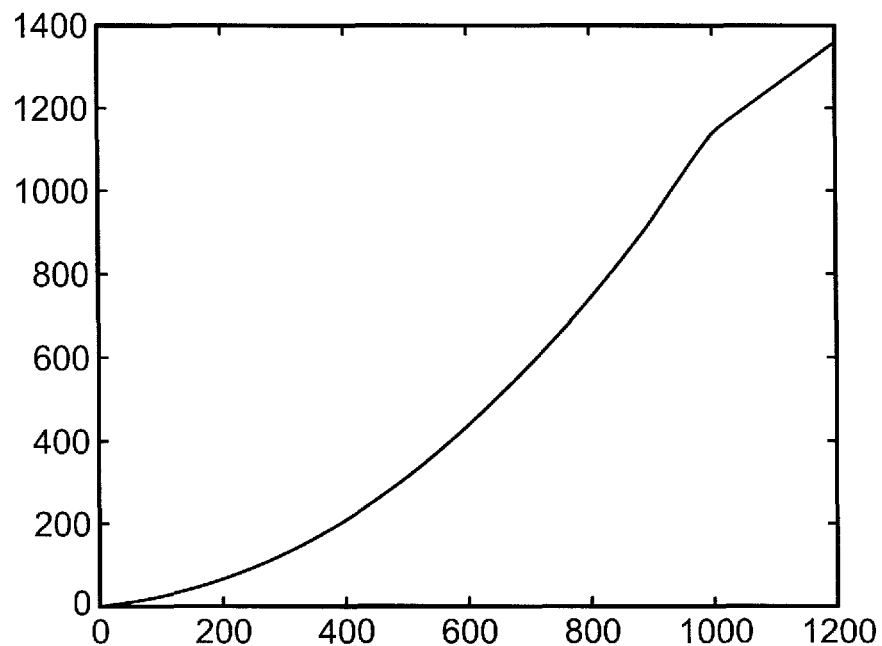
FIG. 17A is a shove filter response for a first range [0 . . . 1200] (full), under an embodiment.
Figure 17B:
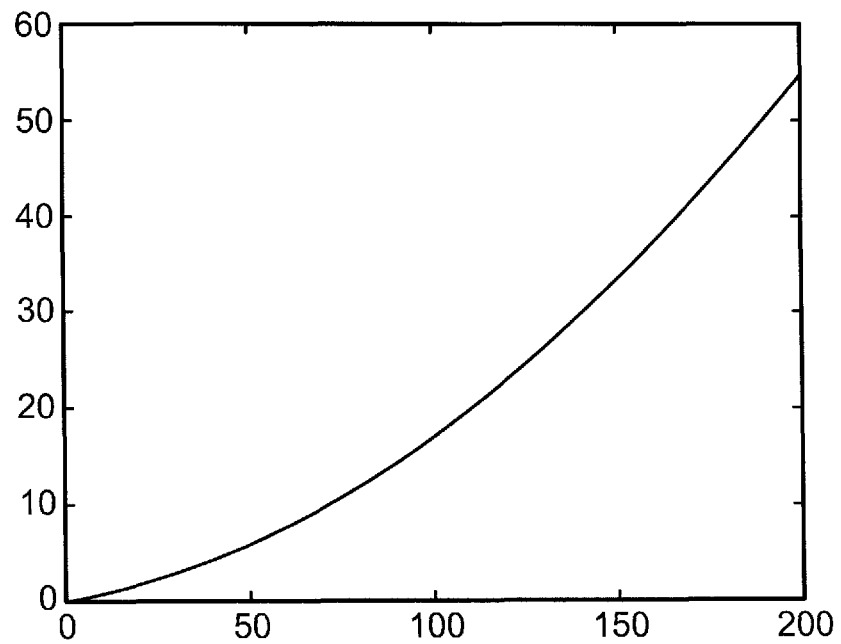
FIG. 17B is a shove filter response for a second range [0 . . . 200] (zoom), under an embodiment.

Expressions of the system's pushback filter are depicted in FIGS. 17A and 17B. In summary, the application calculates hand position displacement, which is separated into components corresponding to the z-axis and x-axis. Offsets are scaled by a coefficient dependent on the magnitude of the offset. The coefficient calculation is tied to the velocity of the motions along the lateral and depth planes. Effectively, small velocities are damped; fast motions are magnified.

Pushback in the media browser includes two components. The description above noted that before the user pushes into the z-axis, he pulls back, which provides a greater range of z-axis push. As the user pulls back, the system calculates the displacement and applies this value to the z-position that is crossed to engage pushback. In contrast to a situation where the user only engages pushback near the end of the gesture, this linkage provides an efficient gesture motion.

Additionally, pushback in the media browser application is adapted for sensor z-jitter. As the palm pushes deeper/farther along the z-axis, the sensor encounters jitter. To enable stable input within the sensor tolerance, the system constrains the ultimate depth reach of the gesture.

Example expressions of pushback gesture filters implemented in the media browser application of the kiosk are as follows, but the embodiment is not so limited:

```
double Pushback::ShimmyFilterCoef(double mag, double dt)
{
    const double vel = mag / dt; // mm/s
    const double kmin = 0.1;
    const double kmax = 1.1;
    const double vmin = 40.0;
    const double vmax = 1800.0;
    double k = kmin;
    if (vel > vmax) k = kmax;
    else if (vel > vmin) k = kmin +
        (vel-vmin)/(vmax-vmin)*(kmax-kmin);
    return k;
}
```

```
double Pushback::ShoveFilterCoef(double mag, double dt)
{
    const double vel = mag / dt; // mm/s
    const double kmin = 0.1;
    const double kmax = 1.1;
    const double vmin = 40.0;
    const double vmax = 1000.0;
    double k = kmin;
    if (vel > vmax) k = kmax;
    else if (vel > vmin) k = kmin +
        ((vel-vmin)/vmax-vmin)*(kmax-kmin);
    return k;
} pos_prv = pos_cur; // new time step so cur becomes prev
const Vect dv = e->CurLoc( ) - pos_prv;
double deltaShove = dv.Dot(shove_direc);
deltaShove *= ShoveFilterCoef(fabs(deltaShove), dt);
double deltaShimmy = dv.Dot(shimmy_direc);
deltaShimmy *= ShimmyFilterCoef(fabs(deltaShimmy), dt);
pos_cur = pos_pry + shove_direc*deltaShove +
    shimmy_direc*deltaShimmy;
```

"Shimmy" covers lateral motion and "Shove" covers forward/backward motion. Both filters are the same in an embodiment, except the shove filter vmax is smaller, which results in faster movement sooner.

Generally, an embodiment computes the position offset (dv) for the current frame and then separates it into the shove component (deltaShove) and shimmy (deltaShimmy) component, which corresponds to the z-axis and x-axis. An embodiment scales the partial offsets by a coefficient that depends on the magnitude of the offset, and reconstructs the combined offset.

If the coefficient is 1.0, no scaling is applied and the physical offset is exactly mapped to the virtual offset. A value in (0.0, 1.0) damps the motion and a value above 1.0 magnifies the motion.

The coefficient calculation is a linear interpolation between a minimum and maximum coefficient (0.1 and 1.1 here) based on where the velocity sits in another range (40 to 1800 for shimmy and 40 to 1000 for shove). In practice, this means that for small velocities, significant damping is applied, but fast motions are magnified by 10%.

FIG. 17A is a shove filter response for a first range [0 . . . 1200] (full), under an embodiment. FIG. 17B is a shove filter response for a second range [0 . . . 200] (zoom), under an embodiment.

::Scrolling Input/Functions:::Jog-Dial

Jog-dial provides an additional scrolling interaction. This two-handed gesture has a base and shuttle, which provides velocity control. The base hand is ofp-open (^^^|-:x^), the shuttle hand ofp-closed (^^^|>:x^). When the system detects the gesture, it estimates their distance over a period of 200 ms. It then maps changes in distance to the horizontal velocity of the slide deck. The gesture relies on a "dead" zone, or central detent, as described in the '845 application.

At any distance exceeding that minimal one, the application maps that value to a velocity. A parameter is calculated that is proportional to screen size, so that the application considers the size of screen assets. This enables, for example, rapid movement on a larger screen where display elements are larger. The speed is modulated by frame rate and blended into a calculated velocity of the shuttle hand.

Example expressions of jog-dial implemented in an embodiment of the kiosk are as follows, but the embodiment is not so limited:

```
double MediaGallery::ShuttleSpeed(double vel) const
{
  double sign = 1.0;
  if (vel < 0.0){
    sign = -1.0;
    vel = -vel;
  }
  const double a = 200.0;
  const double b = 1.0;
  const double c = 0.05;
  const double d = 140.0;
  const double alpha = std::min(1.0, vel/a);
  return sign * -shuttleScale * (vel*alpha +
  (1.0-alpha)*a / (b+exp(-c*(vel-d))));
}
    const double detent = 15.0;
    double dx = dist - baseShuttleDist;
    if (fabs(dx) < detent) return OB_OK; // central detent
    if (dx < 0) dx += detent;
    else dx -= detent;
    // map hand offset into slide offset
    double dt = now - timeLastShuttle;
    timeLastShuttle = now;
    double offset = ShuttleSpeed(dx) * dt;
    shuttleVelocity = offset*0.6 + shuttleVelocity*0.4;
```

Generally, the SOE kiosk of an embodiment estimates hand distance (baseShuttleDist) when the interaction starts and then any change within approximately +/−15 mm has no effect (the central detent), but the embodiment is not so limited. If a user moves more than +/−15 mm, the distance (minus the detent size) is mapped to a velocity by the ShuttleSpeed function. The shuttleScale parameter is proportional to the screen size as it feels natural to move faster on a larger screen since the assets themselves are physically larger. Further, the speed is modulated by the frame rate (dt) and blended into the global shuttleVelocity.

Figure 18A:
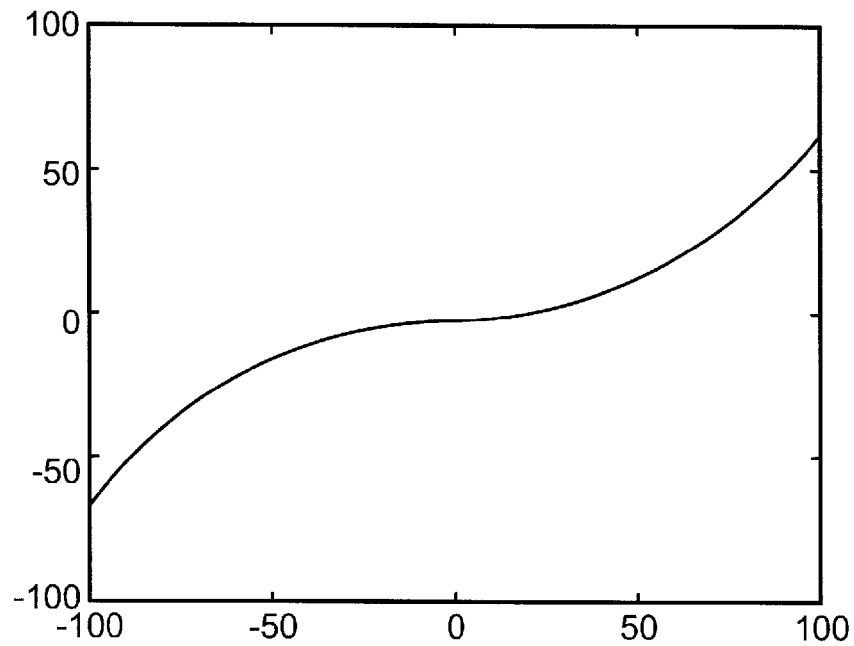
FIG. 18A is a first plot representing velocity relative to hand distance, under an embodiment.
Figure 18B:
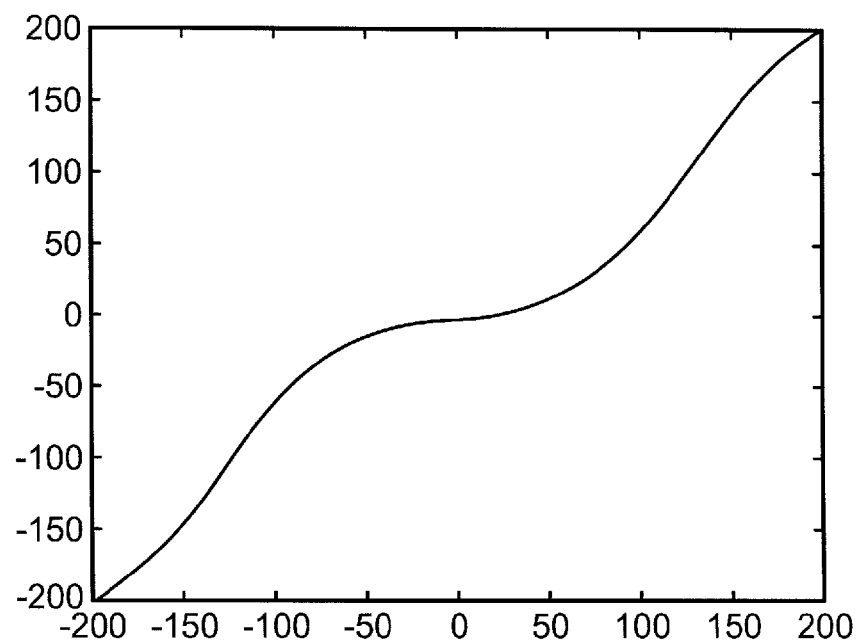
FIG. 18B is a second plot representing velocity relative to hand distance, under an embodiment.
Figure 18C:
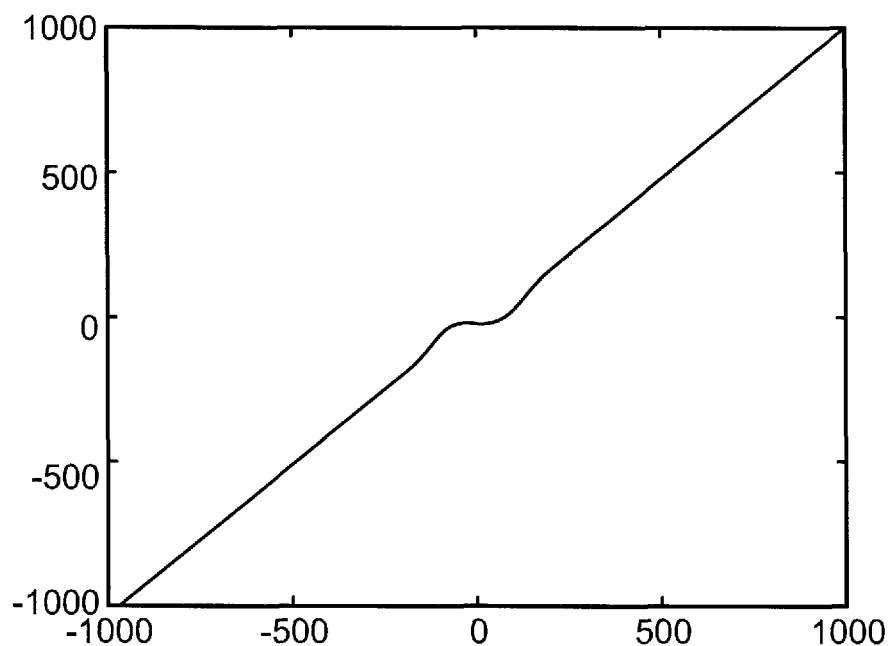
FIG. 18C is a third plot representing velocity relative to hand distance, under an embodiment.

The achieved effect is essentially linear, as depicted in FIGS. 18A-18C, which show how the function behaves over different scales and hand distances. FIG. 18A is a first plot representing velocity relative to hand distance, under an embodiment. FIG. 18B is a second plot representing velocity relative to hand distance, under an embodiment. FIG. 18C is a third plot representing velocity relative to hand distance, under an embodiment. The embodiment is generally linear, meaning distance is directly mapped to velocity, but for small distances the system can move even more slowly to allow more control because the combination of features disclosed herein allows both precise, slow movement and rapid movement.

::iPhone Input

As an SOE agent, the media browser accepts and responds to low-level data available from different devices. For example, the browser accepts inertial data from a device such as an iPhone, which has downloaded the g-speak application for the iOS client. The architecture can designate inputs native to the device for actions: in this instance, a double-tap engages a "pointer" functionality provided by the g-speak pointer application. Maintaining pressure, the user can track a cursor across a slide.

::Video

The application supports video integration and control. Ofp-open (^^^|-:x^) plays video; closing to a fist (^^^>:x^) pauses. Again, the system also accepts data like that from an iPhone, enabled with the g-speak pointer application: double tap pauses playback; slide triggers scrubbing.

Applications::Edge Suite-Upload, Pointer, Rotate

A suite of three applications highlights the data/device integration capabilities of the kiosk. As noted earlier, the SOE is an ecumenical space. The plasma architecture described in the '263 application sets up an agnostic pool for data, which seeks and accepts the range of events. While it is designed and executed to provide robust spatial functionalities, it also makes use of low-level data available from devices connected to the SOE.

The applications upload, pointer, and rotate collect and respond to low-level data provided by a device fundamentally not native to the environment; i.e., a device not built specifically for the SOE. The edge device downloads the g-speak application to connect to the desired SOE. Described here is functionality provided by the g-speak pointer application, which is representative without limiting the g-speak applications for the iOS or any other client.

In these applications an iOS device with the relevant g-speak application can join the SOE at any time, and the data from this "external" agent, so to speak, is accepted. Its data is low-level, constrained in definition. However, the SOE does not reject it based on its foreign sourcing, profile, or quality. Data is exchanged via the proteins, pools, and slawx architecture described in the '263 application. The edge device can deposit proteins into a pool structure, and withdraw proteins from the pool structure; the system looks for such events regardless of source.

This low-level data takes two forms. First, the iOS generates inertial data, providing relative location. The SOE also makes use of "touchpad" mode, which directly maps commands to screen. Persistent is the robust spatial manipulation of an SOE; at the same time, gesture use is strategic. Applications like upload/rotate/pointer are developed specifically for general public settings, where an unrestricted audience interacts with the kiosk. The suite, then, chooses to use a select number of gestures, optimizing for ease-of-use and presentation.

Displayed on the system's home screen are elements including the g-speak pointer app icon, kiosk application icons, the tutorial, and the sensor mirror. The g-speak pointer app icon provides download information. To navigate across applications, the user input is pushback. As her open hand pushes toward the screen (into the z-axis), the menu recedes into a display she rapidly tracks across (in this example, along the horizontal axis). To select an application, the user pauses on the desired application. The "V" gesture (^^V>:x^) prompts selection. Pushback (‖‖-:x^) is used across the applications as an exit gesture. Once the user's open palm crosses a distance threshold, the screen darkens and assets fade. Breaking the gesture, as with a closed fist, triggers exit.

The tutorial and sensor mirror are displayed in a panel near the bottom of every screen, including this system start screen. Installations are described herein where this example suite is used in unrestricted settings, where the general public interacts with the kiosk. The tutorial and sensor mirror are elements beneficial in such settings.

The tutorial is a set of animations illustrating commands to navigate across applications (and, within a selection, to use the application). The sensor mirror, as noted earlier, can act effectively as a debugging mechanism, its feedback helping the user adjust input. Like the tutorial, it also is useful for public access. With a traditional computer, the system is dormant until the user activates engagement. With the kiosk, the sensor mirror is a flag, indicating to the user the system has been engaged. (As stated herein, the information is anonymized and restricted to depth.)

Applications:Edge Suite-Upload

Upload is an application for uploading and viewing images; its design reflects its general public use in settings such as retail and marketing but is not so limited. It deploys familiar iOS client actions. A vertical swipe switches an iPhone to its camera screen, and the user takes a photo. The phone prompts the user to discard or save the image. If a user opts to save, the file is uploaded to the system, which displays the image in its collection. The system accepts the default image area set by the device; this value can be modified by the application caretaker.

The default display is a "random" one, scattering images across the screen. A highlighted circle appears behind an image just uploaded. A double-tap selects the photo. To drag, a user maintains pressure. This finger engagement with the screen issues inertial data accepted by the kiosk.

Moving an image to front and center enlarges the image, in this example. Additional display patterns include a grid; a whorl whose spiral can fill the screen; and radial half-circle. A horizontal swipe cycles through these displays (e.g., with left as previous, and right as next). A double-tap rotates an image rotated by a display like whorl or radial.

The user also can provide touchpad input. This is a direct mapping to the screen (instead of inertial). Double-tap again selects an image, and maintained pressure moves an element. A swipe is understood as this same pressure; a two-finger swipe, then, cycles through displays.

Applications:Edge Suite-Pointer

Pointer is an experiential, collaborative application that engages up to two users. A swipe starts the application. Displayed is a luminescent, chain-link graphic for each user. The chains are bent at its links, coiled and angled in random manner. A double-tap is selection input; maintaining pressure lets the user then move the chain, as if conducting it.

This engagement is designed around the system environment, which presents latency and precision challenges. First, the user connects typically over a wireless network that can suffer in latency. Also, user motion may be erratic, with input also constrained by the data provided by the device. Instead of structuring selection around specific points, the application reads selection as occurring with a general area. As the user swirls the chain across the screen, the visual feedback is fluid. It emphasizes this aesthetic, masking latency.

The pointer application also provides touchpad interaction. Double-tap selects an area, and maintained pressure moves the pointer. The application accepts and displays input for up to two devices.

Applications:Edge Suite-Rotate

A multi-player, collaborative pong game, rotate layers gesture motion on top of accelerometer data. In this example, a ratchet motion controls the paddle of a pong game. Up to five people can participate but the embodiment is not so limited.

Displayed at start, the field of play is a half-circle (180 degrees). A ball bouncing off the baseline of the half-circle ricochets off at some random angle, toward an arc—a paddle—controlled by a user. Each participant is assigned an arc, its color correlated to its player.

The player moves the paddle/arc to strike the ball back to the baseline. Each time the ball bounces again off the center, its speed increases. Each time it strikes the paddle, the paddle gets smaller. (This decrease is some set small percentage, whereby the paddle does not disappear.) The game, then, increases in difficulty.

A double-tap joins the game. The user, maintaining pressure with a digit, rotates the paddle with a ratchet motion. Radial input from the device is passed only when the finger is on the screen. The paddle stops in space, the ball still bouncing, if the user releases pressure. The paddle pulses after approximately ten seconds of no input. The ball freezes with game state freeze when the user moves to exit the game.

The ratchet motion maps to visuals on screen as designed to account for user practice. While the wrist provides a full 180 degrees of rotation, a user starting from a "central" position typically rotates 30 degrees in either direction. The application accounting for this behavior relatively maps this motion to paddle control and feedback. To reach the maximum distance in either direction, for example, the user is not required to fill 180 degrees.

One design and velocity aspect extends the user engagement: paddle size does not always map directly to hit area. To nurture user success and repeat experiences, the application in certain conditions extends paddle function outside of its visually perceived area. When a certain speed threshold is surpassed, the user moving the paddle rapidly, the hit area increases. Akin to "angels in the outfield" effect, this extension does not display, to avoid user perception of a bug. (Because the paddle is indeed moving rapidly, the user's apprehension typically does not keep pace.)

Per its application relevance for commercial settings, the caretaker defines values, modified with text input, that control the game, including arc width, arc distance from center, and ball velocity.

Use Case Examples

The kiosk system brings to bear benefits of flexibility: its installation is lighter, as well as portable. The following examples highlight this operational maneuverability, and invoke functionalities and gestures described in the baseline applications described above. These examples represent, without limiting, the domains that benefit from the SOE kiosk:

:Military

A briefing is convened to review a recent incident in a field of operations. In an operations room with a kiosk, on officer uses the mapping application to convey a range of information, touching on political boundaries; terrain; personnel assets; population density; satellite imagery. Asset location and satellite imagery are linked in from sources appropriate to the briefing nature. Data sources can be stored locally or accessed via the network. The officer selects political boundaries data (palette gesture, ^^^|-:x^) and snaps it to the entire display area (cinematographer, ^^^|-:x^), before zooming in on a recent flare-up in activity (pan/zoom, W-:x^ to ^^^^>:x^). He pulls up the fluoroscope menu on the left side of the display (palette, ^^^|-:x^). He selects (closing his thumb) and snaps (cinematographer, ^^^|-:x^) onto the area first a population density lens, then a terrain lens. After discussing these area contours, he pushes in (zoom, ^^^^>:x^) to note asset location at time of activity. Further zooming in (^^^^>:x^) he expands the region displays and reviews asset location at present-day.

:Emergency Prep and Response

As a hurricane approaches the coastline, government agencies and officials issue advisories and move quickly to share information with the public. The governor's office convenes a press conference with participation of his emergency response czar, weather service director, law enforcement figures, public utility officials, as well as officials from his administration. With a kiosk sourcing data from these different agencies, the press conference uses maps displaying wind data, precipitation data, population density, evacuation routes, and emergency shelters.

:Mining and Oil

An extraction engineer and a geologist review an extraction area, using a geospatial map with lenses for topology; soil samples; subsurface topology; original subsoil resources; rendered subsoil resources. The customized application includes recognition of edge devices. From a global map of operations, the extraction engineer pushes into a detailed display of the extraction area (pan/zoom, VV-:x^ to ^^^^>:x^). From the lens menu she selects rendered subsoil resources (palette, ^^^|-:x^); accessed from an external database over the network, it shows the current expression of subsoil resources. She creates an original subsoil resource lens (frame-it, ^^^|-"x^"), which displays extraction at some point in the past. The geologist uses his iPhone, with the downloaded g-speak pointer application, to point to a particular swath: as they discuss recent geological occurrences, the geologist frames a subsurface topology lens (frame-it, ^^^|-"x^"), and pulling it toward himself, fixes the fluoroscope to the display where an underground river approaches the extraction area. The geologist then grabs the map (fist, ^^^^>:x^): he moves it to slide adjoining regions underneath the subsurface lens, the two colleagues discussing recent activity.

:Medical/Healthcare

A joint reconstruction procedure makes use two kiosks in a sterile operating room. At one screen a nurse controls a version of the media browser. Its default overview display shows patient data such as heart rate, blood pressure, temperature, urine, and bloodwork. A second kiosk runs a spatial mapping implementation, which lets the surgeons zoom in on assets including x-rays, CT scans, MRIs, and the customized procedure software used by the hospital. As the team works, displayed is an image from procedure software, which provides positioning information. A surgeon on the procedure team holds up his fist and pulls it toward himself, to view the thighbone in more detail. (^^^^>:x^). When an unexpected level of resistance is encountered in relevant cartilage, a surgeon on the team pulls up the lens panel and selects MRI images of the area (palette, ^^^|-:x^).

:Presentation

At a financial services seminar a speaker starts a deck presentation. He clicks right to move from one slide to the next (click R, ^^^|-:x^). When an audience member raises a question about building a complete portfolio, he navigates quickly back to a previous slide using two hands (jog dial, ^^^|-:x^), which shows the components of a portfolio in a piechart. He gets out his phone, with the downloaded g-speak pointer application, and holds down a finger to use the device as pointer, discussing the different investment types. He dwells at length on a certain mutual fund. With his free hand, he again navigates quickly to a different slide, this time with pushback (||||-:x^). An audience member asks about structuring college funds for his grandchildren. The speaker jog dials to a slide with video (^^^|-:x^ and ^^^|>:x^), where a customer talks about the same goal, and how the speaker's firm helped him balance his different financial interests.

:Retail Endcap::Luxury

A luxury brand installs a kiosk in key locations of a major department store, including New York, London, Paris, and Tokyo. Its hardware installation reflects brand values, including high-end customization of the casing for the screen. It runs a media browser, showcasing the brand's "lookbook" and advertising campaign. With the simple "L"-like gesture, (^^^|-:x^ to (^^^||:x^ or ^^^|>:x^), users can click through slides with different looks. Video slides throughout play "behind-the-scenes" footage of photo shoots, where the stylist and photographer discuss the shoot. A central video plays footage from the most recent fashion show in Paris.

:Retail Endcap::Grocery Manufacturers

A beverage company installs a kiosk endcap in grocery stores to introduce a new energy drink. Experiential, the kiosk lets users play a version of the collaborative Rotate game. A teen passing by with his mom stops to watch the center graphic on the home screen: the main game graphic, the paddle rotates back and forth to block a bouncing ball. The teen follows the simple instructions at the top of the screen to download the free g-speak pointer application onto his phone. A tutorial graphic at the bottom of the screen shows a hand, finger pressed to phone, rotating the wrist. The teen follows the gesture and plays a few rounds while his parent shops. When his parent returns, the two follow another tutorial on the bottom of the screen, which shows pushback (||||-:x^). This gesture pulls up slides with nutrition information; one slide includes an extended endorsement from a regional celebrity athlete.

As described in detail herein, regardless of technology stack or operating system, the SOE makes use of external data and operations. This includes integrating spatial data of relatively low-level quality from devices including but not limited to mobile units such as the iPhone. Such devices are also referred to as "edge" units. Embodiments described herein include one or more additional specifications and protocols enabling the edge devices of an embodiment, details of which are described in detail below.

Remote Protocol: The g-Speak Remote Class

The Remote class makes it easy to interact with a g-speak SOE using a mobile device or a web interface as input device. It manages the communication with the iOS Pointer app, so that the developer must not deal directly with the metabolization and deposit of proteins. The events will be created and broadcast by the Remote singleton class instance.

It is extremely easy to integrate Remote in an existing g-speak SOE application to support basic functionalities (pointing appear, vanish, move, harden, soften).

Include the remote class.
include "Remote.h"
Instantiate the singleton and append it to any VisiFeld.
main_vf-> AppendChild (Remote::Instance( );
Append the event target(s) as usual.
Remote::Instance( )-> AppendEventTarget (whatever_target);

The event targets will now receive pointing events.

Other features of the Remote class include: Receiving Swipes; Image Request; Text Input Request; Dismiss; Show Color; Save Image; Show Image; and Other Goodies.

More features in the Remote::Metabolizer class include callbacks for a number of proteins deposited by the controller. Go to the Remote::Metabolizer class documentation.

iOS g-Speak 'Pointer' App

The general purpose 'pointer' app can be downloaded and installed for free from the App Store. The app has many features: Pointing, which is moving a pointer around on the screens' surfaces; discrete swipes, which is discrete events (blurts) corresponding to the swiping gesture along the four main directions (up, down, left, right), and swiping must be performed with one finger in Wand mode and with two fingers in Touchpad mode (see below); continuous swipe, which is the instantaneous displacement of the finger on the display (only available in Wand mode, see below); Continuous (roll) angle, which is the absolute (roll) angle around the main device axis, in degrees (only available in Wand mode, see below), and the angle is reset to zero every time the user touches the display/starts to send pointing motion data; and additional behaviors as listed in the use cases.

Figure 19:
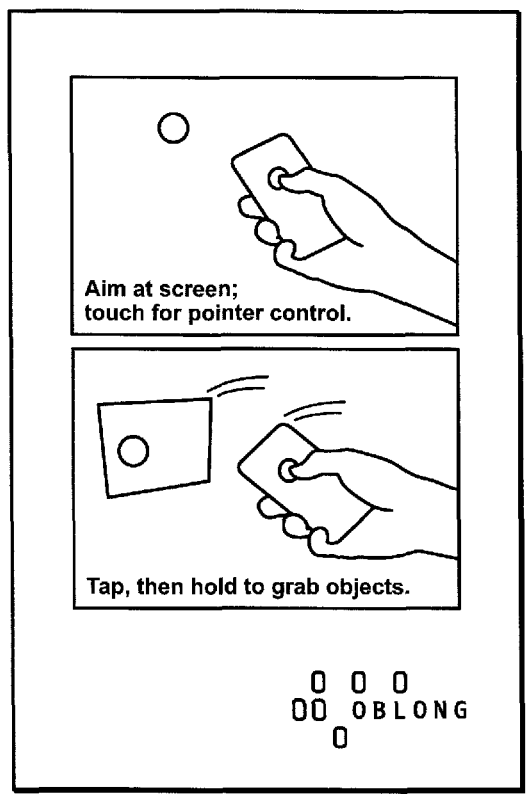
FIG. 19 is a diagram showing the wand mode of the remote protocol of the iOS g-speak "pointer" app, under an embodiment.

There are two interaction modes. Wand mode is available only for devices that have a gyroscope. It mimics the behavior of a wand device like Oblong's wand or the Wiimote. The pointer is moved by touching the display and changing the device orientation in space. No linear movement is detected, only up-down and left-right rotations matter. See FIG. 19.

Figure 20:
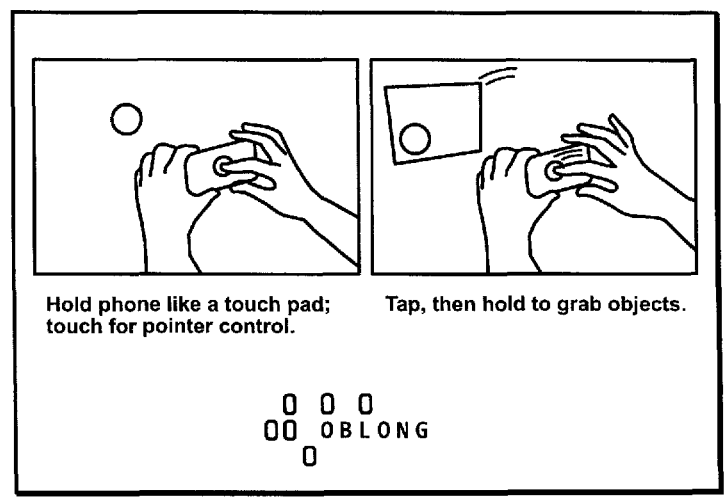
FIG. 20 is a diagram showing the trackpad mode of the remote protocol of the iOS g-speak "pointer" app, under an embodiment.

In Trackpad mode, the device mimics a traditional touchpad. The pointer is moved by moving a single finger on the display surface. Continuous (roll) angle and continuous swipe information are not available while in this mode. See FIG. 20.

Figure 21:
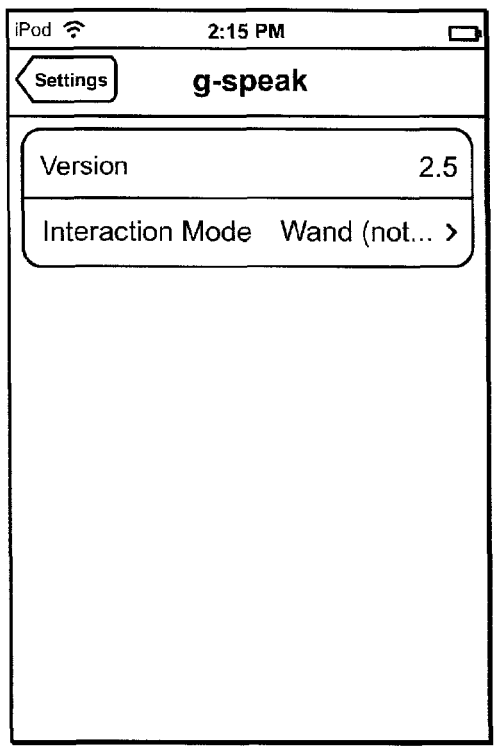
FIG. 21 is a diagram showing the app settings of the remote protocol of the iOS g-speak "pointer" app, under an embodiment.
Figure 22:
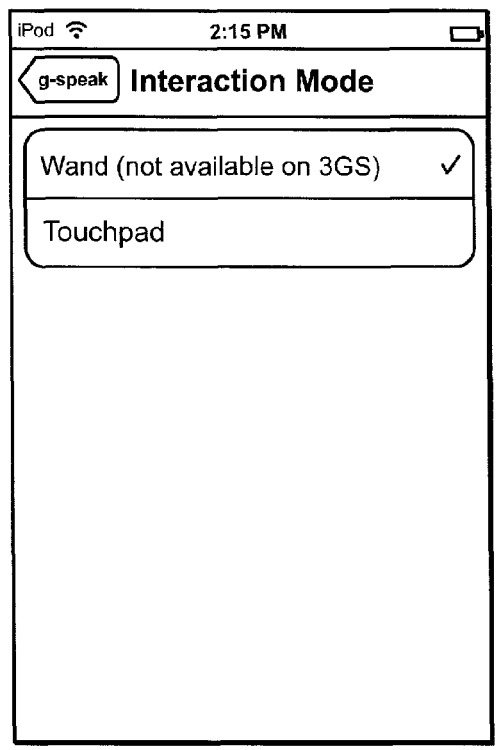
FIG. 22 is a diagram showing the interaction mode of the remote protocol of the iOS g-speak "pointer" app, under an embodiment.

The app settings can be accessed in the usual way in the iOS settings (scroll down in the main menu until you get to the specific apps' settings). See FIG. 21. Two items are available among the settings: Version Number displays the currently installed app version number; and Interaction Mode where either the Wand mode or the Trackpad mode can be selected. See FIG. 22.

With regard to performance, in order for the app to be adequately responsive, it should be used only with a dedicated wifi access point that serves only for that purpose. Learn more about the philosophy behind the app design here.

Figure 23:
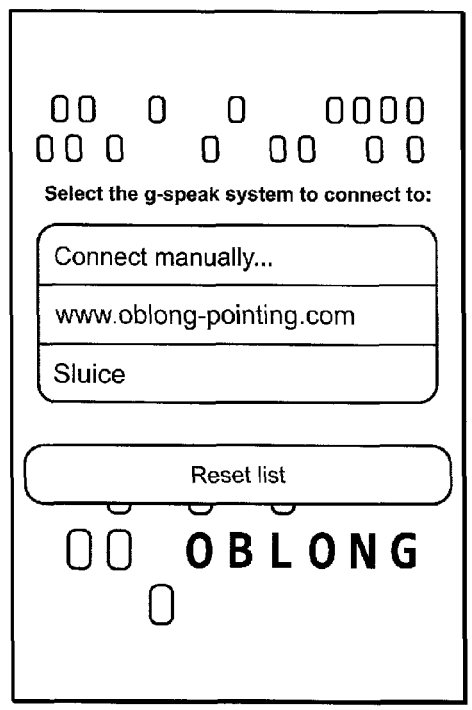
FIG. 23 is a diagram showing the connection view when starting the remote protocol of the iOS g-speak "pointer" app, under an embodiment.

When the app starts, a connection view is displayed. The view contains a table listing all of the found compliant services. Just tap on a service cell to attempt a connection to the corresponding pools. It is always possible to tap on 'Connect manually . . . ' and type the hostname of the system instead. See FIG. 23.

In order for a system to be listed in the table, a few steps must be taken. The remote and remote-data must be created on that machine. A service making the pools available to external machines via TCP must be started. In g-speak this corresponds to run: pool_tcp_server. A service advertising the pools must be started. In Linux, this means running: pool-server-zeroconf-adapter-zyour_service_name-t remote. In Mac OS X, the syntax is slightly different: pool-server-zeroconf-adapter-zyour_service_name-t_remote.

Philosophy

The role of mobile devices in a physical interactive space is different from that of a remote usage scenario (where the app must replace the SOE features). In the local SOE, the mobile device should act like a non-display device: the focus of attention is on the environment and on the other participants. Only in specific moments the device captures the full attention of the user (like when typing some text to be sent to the SOE.) The mobile device/app integrates the SOE, that must be designed as a whole, not as a separate entity from the participating mobile devices.

A dumb device is controlled by the interactive environment. For this reason the app is designed so that, in addition to mere pointing, it just responds to commands from the SOE. It is the SOE that requests for an image upload, or for a text input operation, based on the current interaction events.

Pools, Proteins, Slawx

Figure 24:
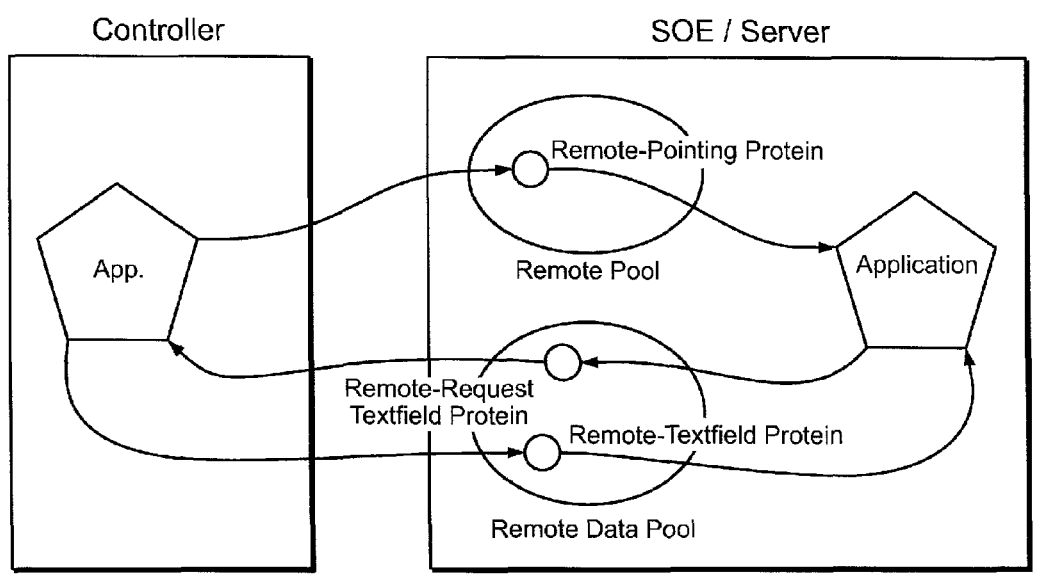
FIG. 24 is a diagram showing the pools, proteins, and slawx of the remote protocol, under an embodiment.

Pools, proteins, slawx are the main elements in Plasma. See FIG. 24.

Pools can be viewed as a transport and immutable storage mechanism for proteins, linearly ordered by time deposited. Pools are persistent data storage entities that can be thought of as append-only lists, though this isn't entirely accurate.

Proteins are something like data structures, but they are more flexible. Proteins are made up of two parts (each one being a slaw): descrips and ingests. Descrips are supposed to be slaw strings, and ingests are supposed to be key-value pairs, where the key is a string. The protein is the only unit of information that can be deposited in a pool.

Slawx (plural of 'slaw') are the lowest level of libPlasma. They represent one data unit, be it unsigned 64-bit integer, complex number, boolean, vector, string, or a list. Slaws are data units, with the ability to store multiple types of data.

The communication between the controller device and the application or SOE happens in two pools: Remote (gestural input proteins deposited by the device); and Remote-data (data input from the device to the SOE, commands and requests from SOE to device). The application is in charge of creating and these pools.

The controller communicates with the application by sending and receiving a set of proteins that is enumerated here.

Plasma

Plasma is part of the g-speak platform developed by Oblong Industries, Inc. The platform provides gestural input, multi-machine and large-screen rendering and coordination, and a new approach to creating interactive engineering applications that are multi-screen, multi-user, and multi-device.

Plasma (libPlasma) is g-speak interprocess communication formalism (for more information click here).

Many questions regarding plasma are answered here. Pools, proteins, slawx in general and their role in this protocol.

Use Cases

All of these use cases involve a conversation of proteins in the remote and remote-data pools.

Pointing, swipes, continuous (roll) angle information is contained in a single protein that is deposited several times per second (usually at a frequency of 15 Hz-30 Hz, depending on the implementation). There is no request for this protein: the controller will start sending it as soon as it connects (whenever the user is actively pointing). These proteins are not sent while the controller is in a secondary view (e.g. taking a picture or typing text). Go to the remote-pointing protein documentation for more details about the specific ingests.

Upon connection, the controller participates in the remote pool. If this succeeds, it participates in the remote-data pool. If this also is successful: The device/client deposits a remote-hello protein in the remote-data pool.

The Take/Send Picture action is initiated by the SOE/application: A remote-request-image protein is deposited by the SOE in the remote-data pool. Depending on the controller implementation, the user can in many different ways cancel the operation (e.g., when the confirmation alert shows up, or while taking the photo); if this is the case: The device/client deposits a remote-response protein with ingest 'canceled' in the remote-data pool. If, instead, the user actually takes/sends the picture: The device/client deposits a remote-image-upload-announcement protein in the remote-data pool. The device/client deposits a remote-image-upload protein in the remote-data pool. This one contains the entire image.

The Enter Text action is initiated by the SOE/application: A remote-request-textfield protein is deposited by the SOE in the remote-data pool. Depending on the controller implementation, the user can in many different ways cancel the operation (e.g. when the confirmation alert shows up, or while typing text); if this is the case: The device/client deposits a remote-response protein with ingest 'canceled' in the remote-data pool. While the user is typing: The device/client deposits a remote-textfield-edit in the remote-data pool. This one contains the current string. When and if the user finalizes the typed text: The device/client deposits a remote-textfield protein in the remote-data pool. This one contains the final string.

It may be necessary for the SOE/application to dismiss any secondary view currently active on a controller, and force it to go back to the main pointing mode/view. This is how it can be done: A remote-dismiss protein is deposited by the SOE in the remote-data pool. When the controller receives this command, it goes back to pointing mode, and: The device/client deposits a remote-response protein with ingest 'canceled' in the remote-data pool.

It may necessary for the SOE/application to upload an image to the controller, so that it can be later set as background for the device display. This is how it can be done: A remote-save-skin-image protein is deposited by the SOE in the remote-data pool An image already present on the device can be set as background: A remote-show-skin-image protein is deposited by the SOE in the remote-data pool. If the image could not be found and successfully opened: The device/client deposits a remote-response protein with ingest 'invalid' in the remote-data pool.

To set Background Color, A remote-show-skin-color protein is deposited by the SOE in the remote-data pool.

List of Proteins Used in the Protocol

Deposited by the controller in the remote pool: Remote-pointing.

Deposited by the controller in the remote-data pool: Remote-hello; Remote-image-upload-announcement; Remote-image-upload; Remote-textfield-edit; Remote-textfield; Remote-response Deposited by the SOE in the remote-data pool: Remote-request-image; Remote-request-textfield; Remote-dismiss; Remote-save-skin-image; Remote-show-skin-image; Remote-show-skin-color.

Protein: Remote-Pointing

This protein is deposited several times per second (usually at a frequency of 15 Hz-30 Hz, depending on the implementation). There is no request for this protein: the controller will start sending it as soon as it connects (whenever the user is actively pointing). These proteins are not sent while the controller is in a secondary view (e.g. taking a picture or typing text). This is the only protein that is deposited in the remote pool.

Protein format:

Descrips:

Remote-pointing

Version.2.0

Ingests:

Provenance: [string] This string identifies the input device, so that the application can deal with multiple concurrent input streams.

Touch: [integer 0 . . . 2] This ingest represents the current inspection state: 0=the user is not touching the display/not moving the pointer; 1=the user is touching the display/moving the pointer; 2=the user is hardening/dragging (button pressed).

Mode: [integer 0 . . . 1] This ingest contains information regarding how to interpret the values in vect: 0=pointing updates are relative; 1=pointing updates are absolute.

vect: [three floating point components vector] Pointing move information. Instantaneous (if mode==0) or absolute (if mode==1) values for the horizontal and continuous pointing motion are stored in the first and second component of the vector. The third component is not currently used. The values represent either the linear or angular change along a specific axis since the last protein. Swipe_direction: [integer 0 . . . 4] Discrete swipe information. This value will almost always be zero (i.e. no swipe), and will have a value between 1 and 4 if a discrete swipe is detected. Discrete swipes are only detected and sent when the user is not hardening (see above). These are the meanings for the different values:

0=no swipe

1=swipe up

2=swipe right

3=swipe down

4=swipe left

Swipe_x: [floating point]

Swipe_y: [floating point] Instantaneous values for the horizontal and continuous swipes, the values, either linear or angular depending on the implementation, represent the change since the last protein, and are measured and sent only if the user is hardening (see above).

Angle: [floating point] The absolute (roll) angle (in degrees) around the main axis of the device. The angle is reset to zero every time the user touches the display/ starts to send pointing motion data.

Number-of-touches: [integer] Number of fingers currently touching the device display. Not currently used in any implementation.

This is a sample of this protein as it is displayed by the command line instruction peek remote:

```
[%YAML 1.1
%TAG ! tag:oblong.com,2009:slaw/
— !protein
descrips:
 -remote-pointing
 -version.2.0
ingests:
 touch: 0
 vect: !vector [0.03338855504989624,
0.0037169046700000763, 0.0]
 ratchet_state: 0
 swipe-direction: 0
 number-of-touches: 0
 provenance: iOS3f777e
 mode: 0
 swipe_y: 0.0
 angle: 59.585534966724609
 swipe_x: 0.0
```

To deal with this kind of protein in g-speak C++ check the Remote class.

Protein: Remote-Hello

A hello protein is deposited by the controller device/client in the remote-data pool in order to notify the SOE/application that a new controller is present. The protein contains useful information regarding the controller Protein format:

Descrips:

Remote-hello

Version. 2.0

Ingests:

Provenance: [string] This string identifies the specific device. It can be used as a recipient descript in many commands sent from the SOE to the controller.

Unique-identifier: [string] The unique identifier of the device.

Name: [string] The name of the device.

Model: [string] The model of the device.

Os: [string] The OS name and version.

Interaction-mode: [either 'Touchpad' or 'Wand'] The current interaction mode. May provide useful information regarding the orientation of the display (landscape or portrait), depending on the device/implementation.

Sample

```
%YAML 1.1
%TAG ! tag:oblong.com, 2009: slaw/
— !protein
descrips:
-remote-hello
-version 2.0
ingests:
    name: oblong training av
    provenance: iOS3f777e
    model: iPod touch
    OS: iPhone OS 5.0.1
    Interaction-mode: Wand
    Unique-identifier:
    41feff395fe5adec272b46726c3559526e3f777e
```

Instances of the Remote::Metabolizer class will have their handler Hello( ) called whenever this protein is deposited in the pool.

Protein: Remote-Image-Upload-Announcement

An image upload announcement protein is deposited by the controller device/client in the remote-data pool just before starting an image upload. It is usually used to inform the SOE about the upcoming image. It contains all the info regarding the image except for the image pixel data itself. Check the use cases for context.

Protein format:
Descrips:
  Remote-image-upload-announcement
  Version 2.0
Ingests:
  Provenance: [string] This string identifies the specific device. It can be used as a recipient descript in many commands sent from the SOE to the controller.
  Image-width: [integer]
  Image-height: [integer] Actual image size in pixels.
  Image-orientation (integer) Image orientation information for those devices/platforms that need to send this info.
  Image-format: [string] A string specifying the encoding format (e.g. "image/jpeg").
  Image-name: [string] Optional image name.
  Conversion-id: [string] This string uniquely identifies the specific conversation: in this case it will contain the same conversation id as the image request.
Sample

```
[%YAML 1.1
%TAG ! tag:oblong.com,2009:slaw/
— !protein
descrips:
-remote-pointing
-version.2.0
ingests:
    image-oreintation: 0
    image-name: name_of_image
    image-format: image/jpeg
    provenance: iOS3f777e
    conversation-id: C90AB805-36FF-
4D1D-0507-13DCDF6A6758
    image-height: 300
    image-width: 225
```

Instances of the Remote::Metabolizer class will have their handler ImageUploadAnnouncement( ) called whenever this protein is deposited in the pool Protein: Remote-Image-Upload An image upload protein is deposited by the controller device/client in the remote-data pool to send an image. It contains all the info regarding the image, including the image pixel data itself. Check the use cases for context.

Protein format:
Descrips:
  Remote-image-upload
  Version 2.0
Ingests:
  Provenance: [string] This string identifies the specific device. It can be used as a recipient descript in many commands sent from the SOE to the controller.
  Image-width: [integer]
  Image-height: [integer] Actual image size in pixels.
  Image-orientation (integer) Image orientation information for those devices/platforms that need to send this info.
  Image-format: [string] A string specifying the encoding format (e.g "image/jpeg").
  Image-name: [string] Optional image name.
  Image-data: [unsigned char*] Actual data bytes.
  Conversion-id: [string] This string uniquely identifies the specific conversation: in this case it will contain the same conversation id as the image request.
Sample

```
[%YAML 1.1
%TAG ! tag:oblong.com,2009:slaw/
— !protein
descrips:
-remote-pointing
-version.2.0
ingests:
    image-oreintation: 0
    image-name: name_of_image
    image-format: image/jpeg
    provenance: iOS3f777e
    conversation-id: C90AB805-36FF-
4D1D-0507-13DCDF6A6758
    image-data: !array [255, 216, 255, 224, 0, 16, 74, 70, 73, ....]
    image-height: 300
    image-width: 225
```

Instances of the Remote::Metabolizer class will have their handler ImageUpload( ) called whenever this protein is deposited in the pool.

Protein: Remote-Textfield-Edit

A textfield edit protein is deposited by the controller device/client in the remote-data pool every time the currently edited textfield changes (i.e. while typing). It contains the current string in the textfield. Check the use cases for context.

Protein format:
Descrips:
  Remote-textfield-edit
  Version 2.0
Ingests:
  Provenance: [string] This string identifies the specific device. It can be used as a recipient descript in many commands.
  Text: [string] The current string in the textfield.
  Conversation-id: [string] This string uniquely identifies the specific conversation: in this case it will contain the same conversation id as the textfield input request.

Sample

```
%YAML 1.1
%TAG ! tag;oblong.com, 2009:slaw/
— !protein
descrips:
-remote-textfield-edit
-version.2.0
Ingests:
    Provenance: iOS3f777e
    Conversation-id: 68DE8679-38A6-6BF1-4D5A-2F584FEC30F1
    Text: Writin
...
```

Instances of the Remote::Metabolizer class will have their handler TextfieldEdit( ) called whenever this protein is deposited in the pool.

Protein: Remote-Textfield

A textfield protein is deposited by the controller device/client in the remote-data pool upon dismissing an edited textfield (i.e. when hitting 'Done' or 'Enter' or 'Send'). It contains the final string in the textfield. Check the use cases for context.

Protein format:
    Descrips:
        Remote-textfield
        Version.2.0
    Ingests:
        Provenance: [string] This string identifies the specific device. It can be used as a recipient descript in many commands sent from the SOE to the controller.
        Text: [string] The current and final string in the textfield.
        Conversation-id: [string] This string uniquely identifies the specific conversation; in the case it will contain the same conversation id as the textfield input request.
    Sample

```
%YAML 1.1
%TAG ! tag;oblong.com, 2009:slaw/
—!protein
descrips:
-remote-textfield
-version.2.0
Ingests:
    Provenance: iOS3f777e
    Conversation-id: 68DE8679-38A6-6BF1-4D5A-2F584FEC30F1
    Text: Writin!
...
```

Instances of the Remote::Metabolizer class will have their handler TextfieldEdit( ) called whenever this protein is deposited in the pool.

Protein: Remote-Response

A response protein is deposited by the controller device/client in the remote-data pool as a response to the SOE/application regarding a previous command. It is usually used to inform the SOE that a secondary view operation (such as taking a picture or entering text) has been canceled by the user. Check the use cases to see when it is used.

Protein format
    Descrips:
        Remote-response
        Version.2.0
    Ingests:
        Provenance: [string] This string identifies the specific device. It can be used as a recipient descript in many commands sent from the SOE to the controller.
        Response: [string] The actual response, that may vary depending on contect (e.g. "canceled", "invalid", . . . ).
        Conversation-id: [string] This string uniquely identifies the specific conversation; in this case it will contain the same conversation id as the command to which it is responding.
    Sample

```
%YAML 1.1
%TAG ! tag;oblong.com, 2009:slaw/
— !protein
descrips:
-remote-response
-version.2.0
Ingests:
    Provenance: iOS3f777e
    Conversation-id: 0BFAE6FC-7F8C-20AC-645B-0F3DCC8250AB
...
```

Instances of the Remote::Metabolizer class will have their handler TextfieldEdit( ) called whenever this protein is deposited in the pool.

Protein: Remote-Request-Image

An image request protein is deposited by the SOE in the remote-data pool in order to command a specific controller device to allow the user to send a picture to the controlled application or environment.

Protein format:
    Descrips:
        Remote-request-image
        Version.2.0
        Recipient: [string] A recipient name string that uniquely identifies the input device; same concept as that of 'provenance' in g-speak.
    Ingests:
        Show-hint: [true/false] Whether or not the hint alert should be showed before opening the secondary text input view. The user will be thus able to cancel the operation if she wants to.
        hint: [string] The message body of the hint alert.
        vibrate: [true/false] Whether or not the input device should vibrate when this command is received; as the iPod cannot vibrate, a feeble sound is played instead, the iPhone will actually vibrate.
        Max-width: [integer]
        Max-height: [integer] Maximum size in pixels of the image that will be sent. The image will be the biggest one that fits in this rectangle while respecting its own aspect ratio.
        Conversation-id: [string] This string uniquely identifies the specific conversation; the controller should include the same received conversation id in any response to this command.
    Sample

```
%YAML 1.1
%TAG ! tag;oblong.com, 2009:slaw/
— !protein
descrips:
-remote-request-image
-version.2.0
-recipient:iOS3f777e
Ingests:
    Show-hint: true
    Hint: Take a pic for that placeholder!
    Vibrate: true
    Max-width: 300
```

Max-height: 300
Conversation-id: 0BFAE6FC-7F8C-20AC-645B-0F3DCC8250AB
...

This is how to deposit an Image Upload Request protein in g-speak C++ using the Remote class.
Protein: Remote-Request-Textfield
A textfield request protein is deposited by the SOE in the remote-data pool in order to command a specific controller device to allow the user to enter text in a textfield.
Protein format
Descrips:
Remote-request-textfield
Version.2.0
Recipient: [string] A recipient name string that uniquely identifies the input device; same concept as that of 'provenance' in g-speak.
Ingests:
Show-hint: [true/false] Whether or not the hint alert should be showed before opening the secondary text input view. The user will be thus able to cancel the operation if she wants to.
hint: [string] The message body of the hint alert.
vibrate: [true/false] Whether or not the input device should vibrate when this command is received; as the iPod cannot vibrate, a feeble sound is played instead, the iPhone will actually vibrate.
Conversation-id: [string] This string uniquely identifies the specific conversation; the controller should include the same received conversation id in any response to this command.
Sample %YAML 1.1
%TAG ! tag;oblong.com, 2009:slaw/
— !protein
descrips:
-remote-request-textfield
-version.2.0
-recipient:iOS3f777e
Ingests:
    Show-hint: true
    Hint: please, write me something...
    Vibrate: true
    Conversation-id: 68DE8679-38A6-6BF1-4D5A-2F584FEC30F1
...

This is how to deposit a Textfield Input request protein in g-speak C++ using the Remote class.
Protein: Remote-Dismiss
A dismiss protein is deposited by the SOE in the remote-data pool in order to command a specific controller device to close any currently open secondary view (like the camera view or the keyboard for text entry) and go back to the pointing mode.
Protein format
Descrips:
Remote-dismiss
Version.2.0
Recipient: [string] A recipient name string that uniquely identifies the input device; same concept as that of 'provenance' in g-speak.
Ingests:
Show-hint: [true/false] Whether or not the hint alert should be showed when dismissing the secondary input view.
hint: [string] The message body of the hint alert.
vibrate: [true/false] Whether or not the input device should vibrate when this command is received; as the iPod cannot vibrate, a feeble sound is played instead, the iPhone will actually vibrate.
Conversation-id: [string] This string uniquely identifies the specific conversation; according to the protocol no reply from the device should be expected for this command.
Sample %YAML 1.1
%TAG ! tag;oblong.com, 2009:slaw/
— !protein
descrips:
-remote-dismiss
-version.2.0
-recipient:iOS3f777e
Ingests:
    Show-hint: true
    Hint: Sorry, I really had to dismiss.
    Vibrate: true
    Conversation-id: 9C2D72E8-694B-5B39-3A66-319902E82399
...

This is how to deposit a Dismiss protein in g-speak C++ using the Remote class.
Protein: Remote-Save-Skin-Image
A save image protein is deposited by the SOE in the remote-data pool in order to command a specific controller device to save a specific image in the device memory (overwriting any pre-existing image with the same name).
Protein format
Descrips:
Remote-save-skin-image
Version.2.0
Recipient: [string] A recipient name string that uniquely identifies the input device; same concept as that of 'provenance' in g-speak.
Ingests:
Skin-name: [string] Image filename to be displayed.
Skin-format: [string] Image file format.
Skin-data: [unsigned char*] Image filename to be displayed.
Sample %YAML 1.1
%TAG ! tag;oblong.com, 2009:slaw/
— !protein
descrips:
-remote-save-skin-image
-version.2.0
-recipient:iOS3f777e
Ingests:
    Skin-name: starry.jpg
    Skin-format: image/jpeg
    Skin-data: !empty/u8 ~
...

This is how to deposit a Save Image protein in g-speak C++ using the Remote class.
Protein: Remote-Show-Skin-Image
A show image protein is deposited by the SOE in the remote-data pool in order to command a specific controller device to display a specific image as a background (the image must be present on the device already; it might have been uploaded via the image upload command protein).

Protein format
Descrips:
  Remote-show-skin-image
  Version.2.0
  Recipient: [string] A recipient name string that uniquely identifies the input device; same concept as that of 'provenance' in g-speak.
Ingests:
  Skin-name: [string] Image filename to be displayed.
  Conversation-id: [string] This string uniquely identifies the specific conversation; the controller should include the same received conversation id in any response to this command.
Sample

```
%YAML 1.1
%TAG ! tag;oblong.com, 2009:slaw/
— !protein
descrips:
-remote-show-skin-image
-version.2.0
-recipient:iOS3f777e
Ingests:
    Skin-name: starry.jpg
    Conversation-id: 0BFAA6FB-7E3C-20BD-6123-1E3DBB8233CA
...
```

This is how to deposit a Show Image protein in g-speak C++ using the Remote class.

Protein: Remote-Show-Skin-Color

A show color protein is deposited by the SOE in the remote-data pool in order to command a specific controller device to change its background color to a specific RGB color.

Protein format
Descrips:
  Remote-show-skin-color
  Version.2.0
  Recipient: [string] A recipient name string that uniquely identifies the input device; same concept as that of 'provenance' in g-speak.
Ingests:
  Skin-red: [0.0-1.0] The red channel value of the background color to be applied.
  Skin-green: [0.0-1.0] The red channel value of the background color to be applied.
  Skin-blue: [0.0-1.0] The red channel value of the background color to be applied.
Sample

```
%YAML 1.1
%TAG ! tag;oblong.com, 2009:slaw/
— !protein
descrips:
-remote-show-skin-color
-version.2.0
-recipient:iOS3f777e
Ingests:
    Skin-red: 0.25
    Skin-green: 1.0
    Skin-blue: 0.33
...
```

This is how to deposit a Show Color protein in g-speak C++ using the Remote class.

Remote Class: Depositing an Image Request Protein

This is how to create and deposit an image request protein using the g-speak Remote class:

```
Bool should_vibrate = true;
Str conversation_id =
    Remote:: DepositImageRequest (
        Remote::ImageRequestProtein (
            E -> Provenance ( ),
            "Take a pic for that placeholder!"
            300, 300
            Should_vibrate));
```

Remote Class: Depositing an Textfield Input Request Protein

This is how to create and deposit an textfield protein using the g-speak Remote class:

```
Protein p = Remote::TextfieldRequest:Protein
    (
        Provenance,
        "Please, write me
    Something...");
        Remote::DepositTextfieldRequest (p);
```

Remote Class: Depositing a Dismiss Protein

This is how to create and deposit a dismiss protein using the g-speak Remote class:

```
Protein p = Remote::DismissProtein
(provenance,
    "Sorry, I really had to dismiss.",
True);
    Remote::DepositDismiss (p);
```

Remote Class: Depositing a Save Image Protein

This is how to create and deposit a save image protein using the g-speak Remote class:

```
Protein p = Remote::SaveSkinImageProtein (
    Provenance,
    "starry.jpg");
    Remote::DepositSaveSkinImage (p);
```

Remote Class: Depositing a Show Image Protein

This is how to create and deposit a show image protein using the g-speak Remote class:

```
Protein p = Remote::ShowSkinImageProtein (
    Provenance,
    "starry.jpg");
    Remote::DepositShowSkinImage (p);
```

Remote Class: Depositing a Show Color Protein

This is how to create and deposit a show color protein using the g-speak Remote class:

```
Protein p = Remote::ShowSkinColorProtein (
    Provenance,
    0bColor (1.0, 0.3, 0.8,
1.0));
    Remote::DepositShowSkinColor (p);
```

Remote Class: Other

This is how to extract the recipient name (provenance) and protein version from a protein using the g-speak Remote class:

```
WARN ("extracting version "+
    Remote::ExtractVersionFromProtein (p));
WARN ("extracting recipient "+
    Remote::ExtractRecipientFromProtein (p));
```

This is how to check whether the input device supports the Remote advanced functions using the g-speak Remote class:

```
if (Remote::SupportsAdvancedFunctions (e))
{...}
```

Remote Class: Receiving Swipes

The Remote class defines the following constants:

```
#define NO_SWIPE_UTTERANCE "no swipe"
#define SWIPE_UP_UTTERANCE "swipe up"
#define SWIPE_RIGHT_UTTERANCE "swipe right"
#define SWIPE_DOWN_UTTERANCE "swipe down"
#define SWIPE_LEFT_UTTERANCE "swipe left"
```

Any event target that has been appended to the unique Remote class instance (as described here) will receive the discrete swipes as blurts. The utterance (according to the above constants) will specify the swipe direction.

The usual blurt handlers will be then called:

```
ObRetort OEBlurtAppear (OEBlurtAppearEvent
*e, Atmosphere *atm)
    { if (e-> Utterance ( ) ==
SWIPE_RIGHT_UTTERANCE)
        { // ... }
    if (e-> Utterance ( ) ==
SWIPE_LEFT_UTTERANCE)
        { // ... }
    if (e-> Utterance ( ) ==
SWIPE_UP_UTTERANCE)
        { // ... }
    if(e-> Utterance( ) ==
SWIPE_DOWN_UTTERANCE)
        { // ... }
    Return OB_Ok;
}
Go back to the Remote class main page.
```

The g-Speak Remote::Metabolizer Class

In order to speed up the development with the Remote class, a convenience class named Remote::Metabolizer is provided.

When a class subclasses from Remote::Metabolizer, its instances will feature a set of callback handlers that will be called when relevant proteins are deposited by the controllers. To enable the automatic metabolization of such proteins, the default metabolizers will need be appended:

```
YourClass *yc = new YourClass ( );
Remote::AppendDefaultMetabolizers <YourClass>(yc);
Here is an empty class shell with all the handlers:
Class YourClass :    public Showy Thing,
                     Public Remote::Metabolizer
```

-continued

```
{
ObRetort Hello (const Str &provenance,
                Const Str &name,
                Const Protein &prt,
                Atmosphere *atm)
    { // ...
        Return OB_OK;
    }
ObRetort ImageUpload (const Str &provenance,
                      Const Str &conversation_id,
                      Const Protein &prt,
                      Atmosphere *atm)
    { // ...
        Return OB_OK;
    }
ObRetort ImageUploadAnnouncement (const Str &provenance,
                                   Int Width, int height,
                                   Const Str &conversation_id,
                                   const Protein &prt,
                                   Atmosphere *atm)
    { // ...
        Return OB_OK
    }
ObRetort Response   (const Str &provenance,
                     Const Str &response,
                     Const Str &conversation_id,
                     Const Protein &prt,
                     Atmosphere *atm)
    { if (response == "canceled")
        {...}
    Return OB_OK;
    }
ObRetort TextfieldEdit (const Str &provenance,
                        Const Str &text,
                        Const Protein &prt,
                        Atmosphere *atm)
    { // ...
        Return OB_OK;
    }
ObRetort Textfield  (const Str &provenance,
                     Const Str &text,
                     Const Protein &prt,
                     Atmosphere *atm)
    { // ...
        Return OB_OK;
    }
};
```

Please refer to the use cases for contextualization.

What is claimed is:

1. A system comprising:

a processor coupled to a plurality of display devices;

a gesture interface coupled to the processor, wherein the gesture interface is configured to detect a first gesture of at least one object from gesture data received at the processor, identify the first gesture from a first set of gestures, and translate the first gesture to a gesture signal;

an edge device coupled to the processor via a native application hosted on the edge device, wherein the processor is configured to detect a second gesture of the edge device using data of the edge device, identify the second gesture from a second set of gestures, and translate the second gesture to the gesture signal, wherein the edge device includes a mobile communication device;

applications running on the processor, wherein the applications are configured to control content simultaneously across the plurality of display devices in response to the gesture signal.

2. A system comprising:
a processor coupled to a plurality of display devices and a plurality of sensors;
remote client devices coupled to the processor; and
applications coupled to the processor, wherein the applications are configured to orchestrate simultaneous rendering of content from the remote client devices across the plurality of display devices and the remote client devices, and are configured to allow simultaneous control of the plurality of display devices from the remote client devices, wherein the simultaneous control comprises automatically detecting a gesture of at least one object from gesture data received via the plurality of sensors and from an application running on at least one of the remote client devices, and controlling at least one of the plurality of display devices and content of the remote client devices in response to the gesture signal.

* * * * *